United States Patent
Nishimura et al.

(10) Patent No.: US 8,302,719 B2
(45) Date of Patent: Nov. 6, 2012

(54) VEHICLE HAVING POWER STOCKING MECHANISM AND VEHICLE SYSTEM CONTAINING THE SAME

(75) Inventors: Dai Nishimura, Tochigi (JP); Kazutoshi Takada, Tochigi (JP); Satoshi Kanbayashi, Tochigi (JP); Muneki Yamada, Tochigi (JP); Kentaro Suzuki, Tochigi (JP); Yasuo Watanabe, Tochigi (JP); Shinichi Kuriyama, Tochigi (JP); Nobuyoshi Muromoto, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 233 days.

(21) Appl. No.: 12/715,758

(22) Filed: Mar. 2, 2010

(65) Prior Publication Data

US 2010/0230196 A1 Sep. 16, 2010

(30) Foreign Application Priority Data

Mar. 12, 2009 (JP) ................................ 2009-058942
Mar. 12, 2009 (JP) ................................ 2009-058943
Mar. 18, 2009 (JP) ................................ 2009-065810

(51) Int. Cl.
*B60K 6/00* (2007.10)

(52) U.S. Cl. ...................................................... 180/165

(58) Field of Classification Search .................. 180/165; 701/22, 23; 105/35, 49; 104/289; 74/469, 74/470, 473.11; 446/39–41, 44, 459, 464
See application file for complete search history.

(56) References Cited

U.S. PATENT DOCUMENTS

| | | | | |
|---|---|---|---|---|
| 1,112,595 A * | 10/1914 | Brown | | 180/165 |
| 2,137,574 A * | 11/1938 | Kromer | | 180/165 |
| 4,241,534 A * | 12/1980 | Larsson et al. | | 446/464 |
| 4,479,356 A * | 10/1984 | Gill | | 180/165 |
| 4,493,671 A * | 1/1985 | Kennedy et al. | | 446/464 |
| 4,813,509 A * | 3/1989 | Harris | | 180/165 |
| 4,941,407 A * | 7/1990 | Pigott | | 104/289 |
| 5,211,115 A * | 5/1993 | Maier et al. | | 104/288 |
| 6,557,476 B2 * | 5/2003 | Batisse | | 104/289 |
| 6,612,245 B2 * | 9/2003 | Kumar et al. | | 105/26.05 |
| 6,764,376 B2 * | 7/2004 | Agostini et al. | | 446/466 |
| 8,120,190 B2 * | 2/2012 | Bravo | | 290/1 R |
| 2008/0185201 A1 * | 8/2008 | Bishop | | 180/165 |

FOREIGN PATENT DOCUMENTS

JP 2004-331052 A 11/2004

OTHER PUBLICATIONS

Office Action on the corresponding Chinese patent application issued May 9, 2012 and English Translation.

* cited by examiner

*Primary Examiner* — J. Allen Shriver, II
*Assistant Examiner* — James M Dolak
(74) *Attorney, Agent, or Firm* — Arent Fox LLP

(57) ABSTRACT

A vehicle including an energy stocking mechanism having an elastic member connected to the driving wheel of the vehicle so that power of the driving wheel is stocked as elastic force in the elastic member and the stocked elastic force is output as power to the driving wheel, and an output limiter that holds the energy stocking mechanism when the elastic force is stocked in the elastic member and releases the holding of the energy stocking mechanism to output the elastic force when the vehicle starts running. A power stocking source for stocking elastic force into the energy stocking mechanism is installed in the vehicle or a station at which the vehicle stops, and connected to the energy stocking mechanism so that power from the power stocking source is applied to the energy stocking mechanism and stocked as the elastic force in the energy stocking mechanism.

6 Claims, 20 Drawing Sheets

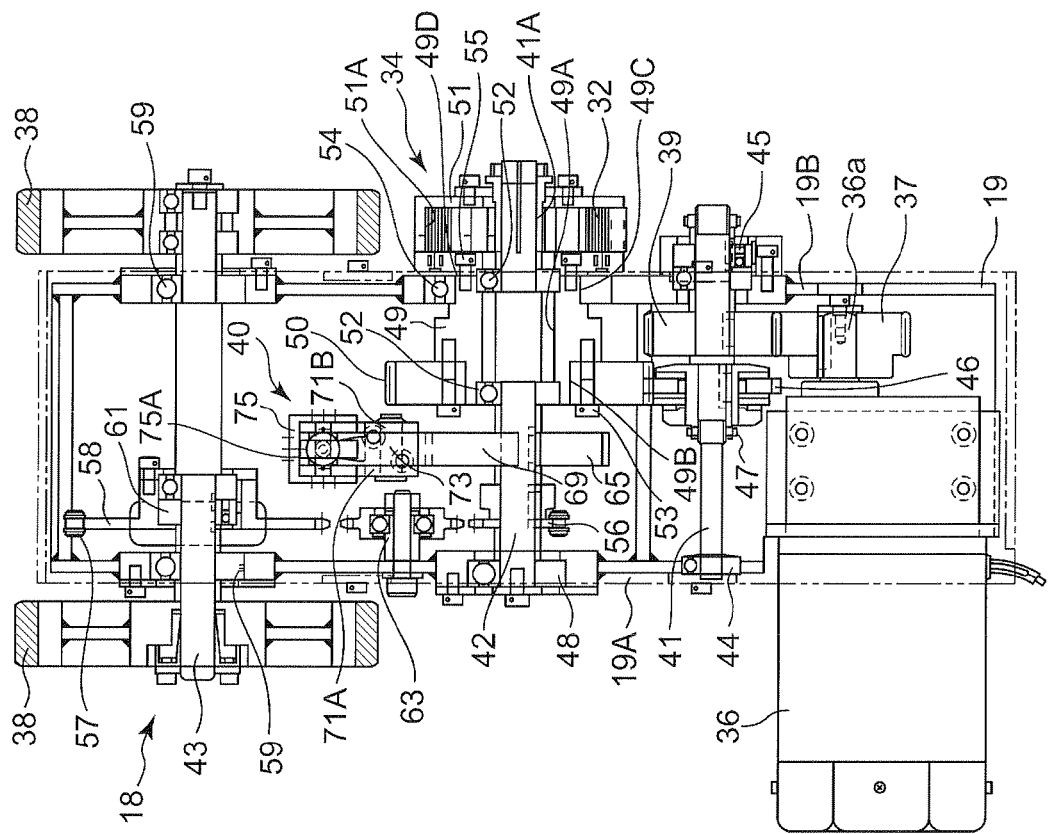

UNDER MOTOR WIND-UP

UNDER SPG ASSIST

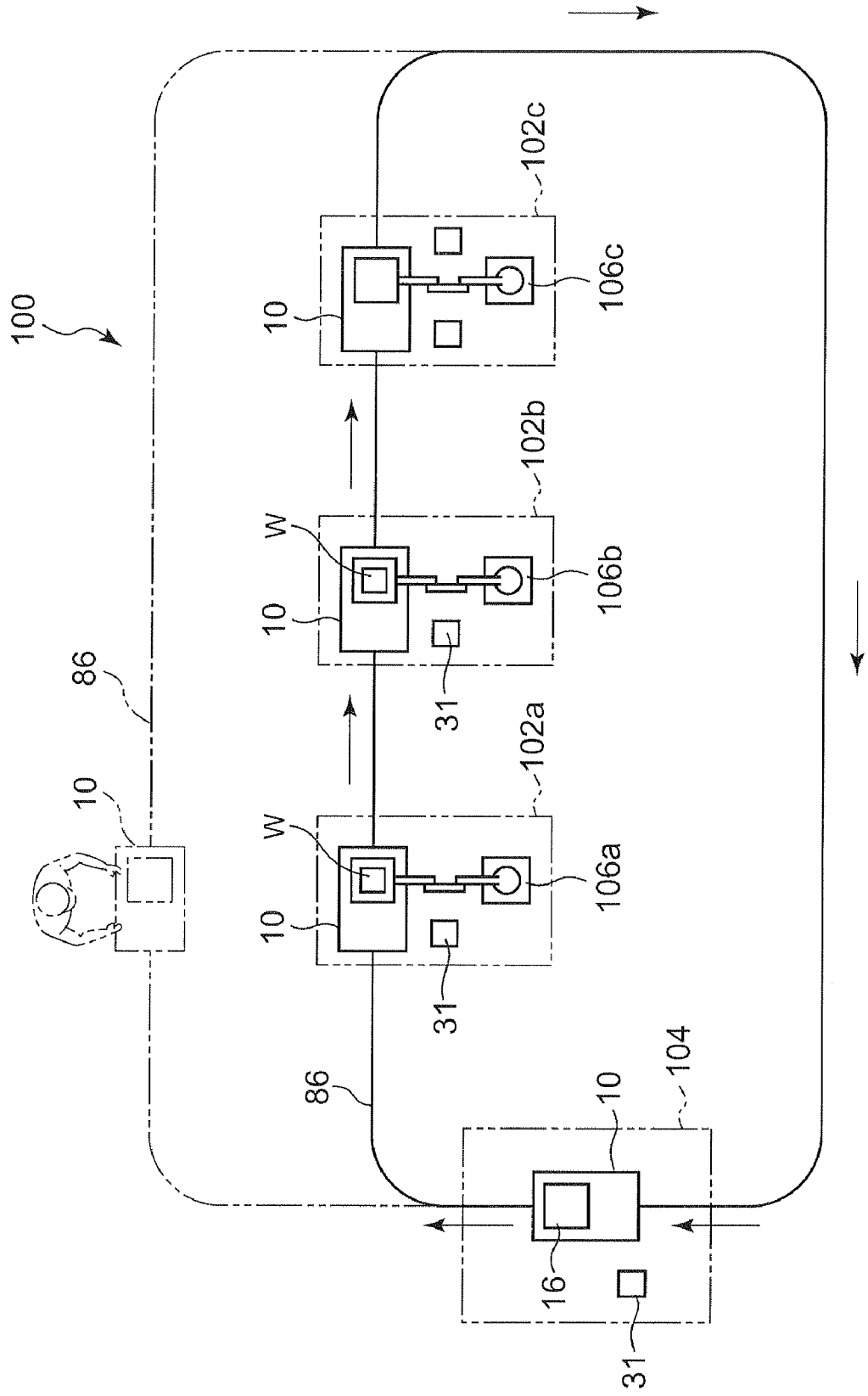

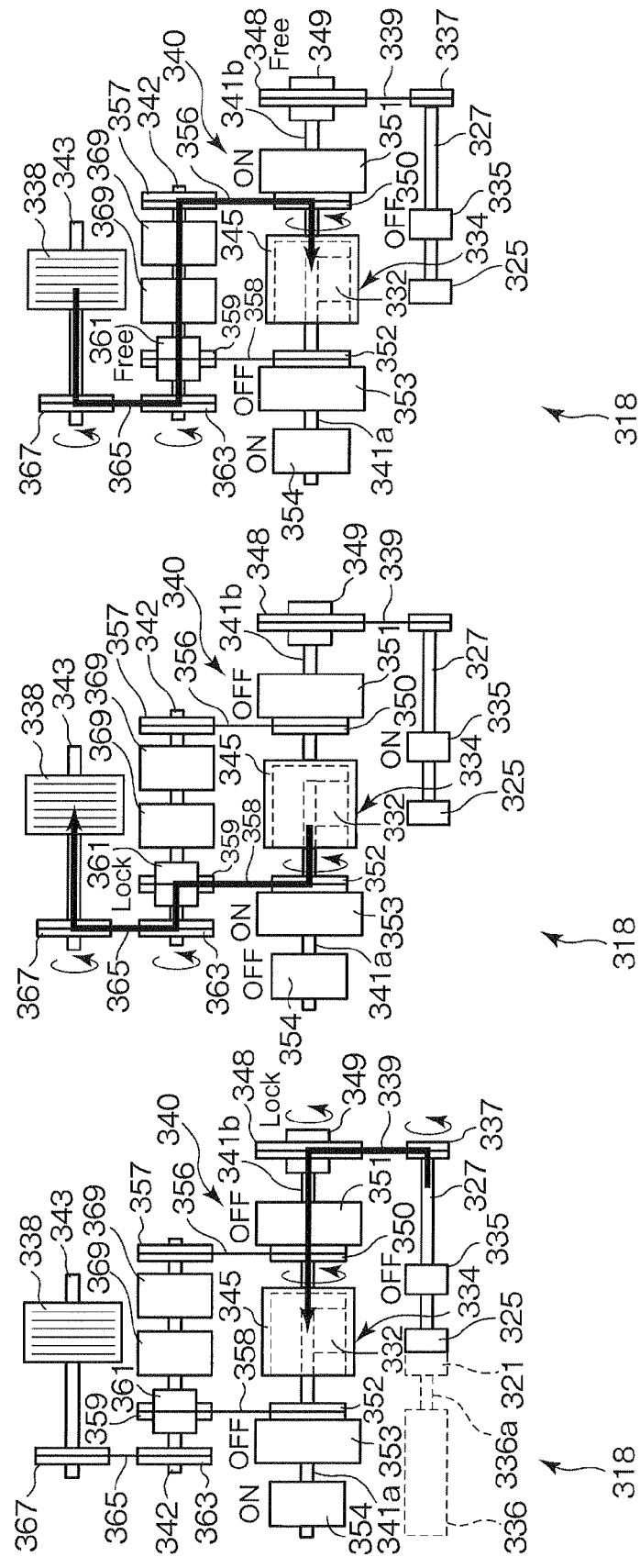
FIG.19C UNDER SPG REGENERATION
FIG.19B UNDER SPG ASSIST
FIG.19A UNDER MOTOR WIND-UP

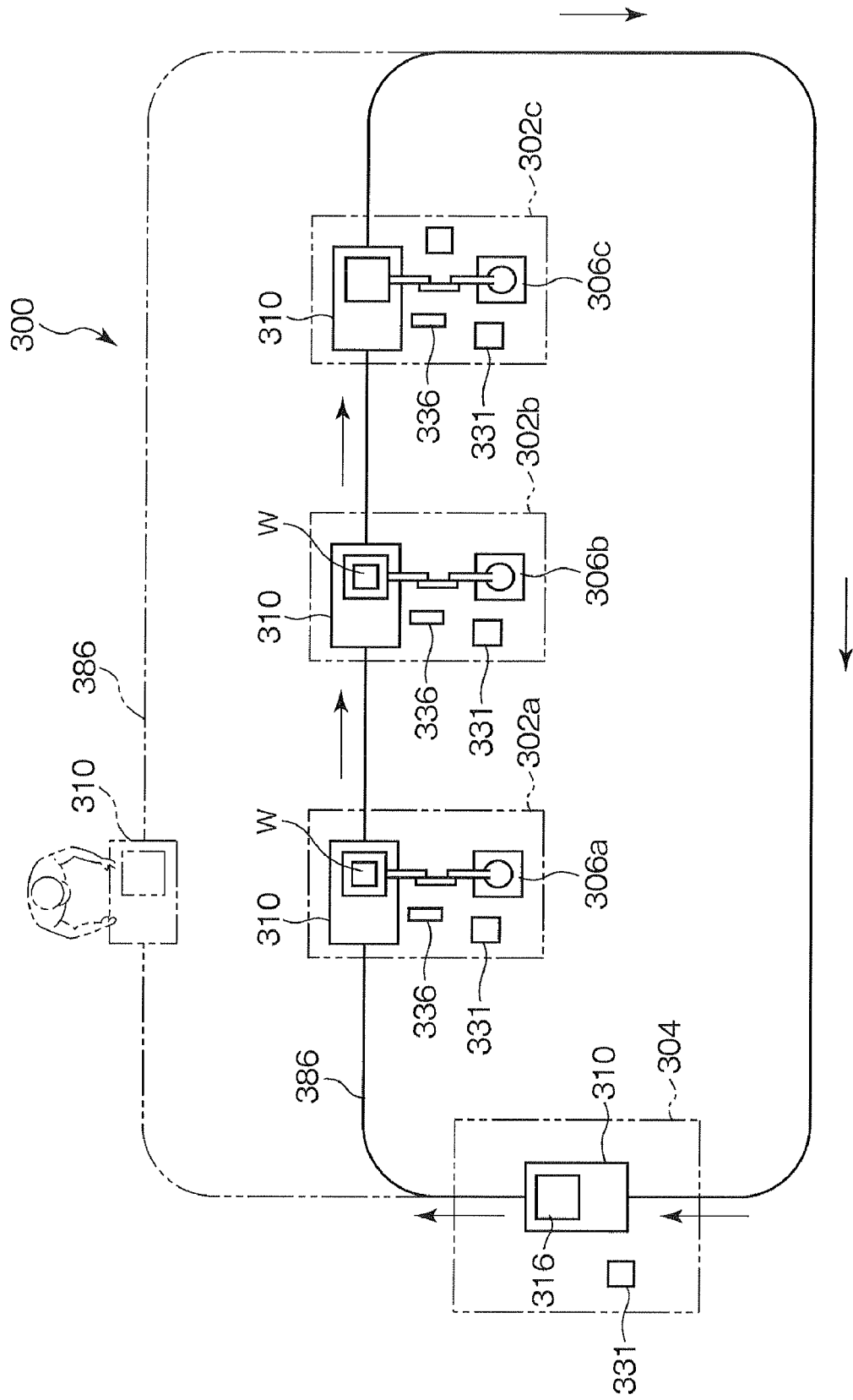

VEHICLE HAVING POWER STOCKING MECHANISM AND VEHICLE SYSTEM CONTAINING THE SAME

INCORPORATION BY REFERENCE

The present application claims priority under 35 U.S.C. §119 to Japanese Patent Application Nos. 2009-058942 and 2009-058943 filed on Mar. 12, 2009 and Japanese Patent Application No. 2009-065810 filed on Mar. 18, 2009. The content of the applications is incorporated herein by reference in its entirety.

BACKGROUND OF THE INVENTION

1. Field of the Invention

The present invention relates to a vehicle running with power such as elastic force stocked in an elastic member, and a vehicle system containing the vehicle and a station at which the vehicle is stopped.

2. Description of Related Art

An unmanned automated guided vehicle (AGV: Automated Guided Vehicle) which runs with power from a battery mounted therein has been used as a vehicle for conveying a part (work) such as an engine, a gear box or the like to each working station in a production field such an automobile factory or the like. Specifically, in the unmanned automated guide vehicle as described above, a motor for running is rotationally driven with the power from the battery to drive driving wheels of the vehicle, whereby the vehicle runs. With respect to this type of conveying vehicle, sufficient output power is required to the running motor because it conveys a heavy object such as an engine part or the like. Accordingly, there has been concern that the equipment cost and the power consumption would increase due to increase in size of motors and thus increase in size of vehicles.

For example, JP-A-2004-331052 discloses a conveying vehicle for conveying a part (work) such an automatic transmission or the like which is provided with neither electrically-operated driving system nor hydraulically operated driving system. In this conveying vehicle, a rack-and-pinion mechanism is driven due to the empty weight of a work being conveyed to make forward driving force of the vehicle, and also the empty weight of the work is stocked in a coil spring (elastic member) provided to a seat. When the work is taken out from the seat, the rack-and-pinion is reversely driven by repulsive force of the coil spring, thereby making backward driving force of the vehicle.

In this case, the conveying vehicle disclosed in JP-A-2004-331052 can merely reciprocate on a predetermined linear passage, and thus it is difficult to apply this conveying vehicle to a production line along which plural kinds of parts are conveyed, assembled with one another, etc. Furthermore, it is not easy to change the conveying passage. In addition, the starting operation of the conveying vehicle is dependent on a work of mounting a work onto the seat of the vehicle or removing the work from the seat, and thus the control of the starting operation is cumbersome.

SUMMARY OF THE INVENTION

Therefore, the present invention has been implemented in view of the foregoing situation, and has an object to provide a vehicle that can run on a desired moving passage, and easily perform a starting operation.

Furthermore, the present invention has another object to provide a vehicle in which power for stocking elastic force in an elastic member can be reduced to thereby perform energy saving (power saving).

Still furthermore, the present invention has a further object to provide a vehicle system that can reduce the weight of a vehicle, and easily stock elastic force in an elastic member even in a water-wetted workshop (station).

In order to attain the above objects, according to an aspect of the present invention, a vehicle running with power from a power source comprises: an energy stocking mechanism having an elastic member that is connected to a driving wheel of a vehicle main body, converts power of the driving wheel to elastic force, stocks the converted elastic force and outputs the stocked elastic force as power to the driving wheel; and an output limiter that holds the energy stocking mechanism while the elastic force is stocked in the elastic member, and releases the holding of the energy stocking mechanism to output the elastic force when the vehicle starts running, wherein the power source is a power stocking source for stocking elastic force in the energy stocking mechanism, and the energy stocking mechanism is connectable to the power stocking source so that power from the power stocking source is applied to the energy stocking mechanism and stocked as the elastic force in the energy stocking mechanism.

According to this construction, the energy stocking mechanism is configured so that the stocking power source is connectable to the energy stocking mechanism and power is applied from the stocking power source to the energy stocking mechanism to stock the power as elastic force in the elastic member of the energy stocking mechanism. Therefore, by driving the stocking power source, the elastic force can be stocked in the energy stocking mechanism in advance, and thus the vehicle can run on a desired moving passage by using this elastic force. Furthermore, the vehicle is provided with the output limiter which holds the energy stocking mechanism under the state that the elastic force is stocked in the elastic member and also releases the holding concerned to output the elastic force concerned when the vehicle starts running. Therefore, the elastic force stocked in the elastic member can be used at a desired time by a desired amount, and the operation of starting running can be easily performed.

In the above construction, the power stocking source may be installed in the vehicle main body so as to be connected to the energy stocking mechanism. According to this construction, the connecting operation between the energy stocking mechanism and the stocking power source is unnecessary, and thus elastic force can be stocked in the energy stocking mechanism with a simple construction.

Furthermore, the output limiter may comprise a gear formed on a shaft connected to the driving wheel, and a ratchet that has a pawl engaged with the gear to lock the shaft when the elastic force is stocked in the energy stocking mechanism and swings the pawl so that the pawl is separated from the gear when the elastic force is output from the energy stocking mechanism. According to this construction, the construction of the output limiter can be simplified. The stock of the elastic force in the energy stocking mechanism or the output of the elastic force concerned can be performed by a simple operation of swinging the ratchet.

Still furthermore, the elastic member of the energy stocking member may be formed of a spiral spring that is wound up around the shaft connected to the driving wheel, and one end of the spiral spring may be connected to the outer periphery of one shaft end portion of the shaft while the other end of the spiral spring is connected to a parallel portion that extends in parallel to the shaft end portion of the shaft and rotates around the shaft interlockingly with the stocking power source. According to this construction, for example, one element of the shaft and the parallel portion is fixed so as not to rotate and the other element is rotated by the stocking power source, whereby elastic force can be stocked in the spiral spring. Furthermore, the other element of the shaft and the parallel portion is fixed so as not to rotate and the one element is rotated by the stocked elastic force, whereby the elastic force stocked in the spiral spring can be output. In this case, the shaft and the parallel portion can be rotated in the same direction in both the stock operation and the output operation. Therefore, the stock of the elastic force in the energy stocking mechanism or the output of the elastic force can be smoothly performed.

Still furthermore, the vehicle may further comprise a controller for controlling the output limiter so that the elastic force stocked in the energy stocking mechanism is allowed to be output when the vehicle starts running and the rotation of the shaft is locked when a desired time containing a zero time elapses after the speed of the vehicle main body reaches a desired speed containing a zero speed. According to this construction, for example, the stocked elastic force can be used only when the vehicle is accelerated, so that the use efficiency of the elastic force can be enhanced and also the frequency of the wind-up work based on the stocking power source can be reduced.

Still furthermore, the vehicle may further comprise a main driving wheel for driving the vehicle main body and a running driving source for driving the main driving source, wherein the power stocked in the elastic member of the energy stocking mechanism assists driving force of the running driving source. According to this construction, the power stocked in the elastic force of the energy stocking mechanism assists the running driving source, and this assist enables the running driving source to be designed to be low in power and compact in size, so that weight saving and energy saving can be performed.

Still furthermore, the vehicle may further comprise a clutch mechanism for performing a switching operation between output of power from the elastic member of the energy stocking mechanism to the driving wheel of the vehicle main body and regeneration of power from the driving wheel to the elastic member, wherein the vehicle runs by a prescribed distance, the vehicle starts running with power stocked in the energy stocking mechanism, and the clutch mechanism is switched to a regeneration side during running so that power is generated from the driving wheel to the elastic member while the vehicle is running. According to this construction, the clutch mechanism is provided to execute the switching operation between the output of the power from the elastic member of the energy stocking mechanism to the driving wheel of the vehicle main body and the regeneration of power from the driving wheel to the elastic force. Therefore, by switching the clutch mechanism, the power of the driving wheel under running can be regenerated (stocked) as elastic force into the elastic member of the energy stocking member. Therefore, when the vehicle runs next, the stocking power source may be driven to supplement the elastic member of the energy stocking mechanism with extra elastic force to be added to insufficient elastic force stocked by only the regeneration. Accordingly, the power for stocking elastic force in the elastic member can be reduced, and the energy consumption for driving the stocking power source can be reduced, so that energy saving can be enhanced.

Still furthermore, the energy stocking mechanism may have a rotational shaft for winding up the spiral spring as the elastic member, the rotational shaft may be divided into first and second rotational shafts, and one end of the spiral spring may be connected to the outer periphery of a shaft end portion of the first rotational shaft while the other end of the spiral spring is integrated with the second rotational shaft and connected to a parallel portion extending in parallel to the shaft end portion of the first rotational shaft. According to this construction, for example, one of the first and second rotational shafts is fixed not to rotate and the other rotational shaft is rotated by the stocking power source or the rotational force of the driving wheel, whereby elastic force can be stocked or regenerated in the spiral spring. Furthermore, for example, the other rotational shaft of the first and second rotational shafts is fixed not to rotate and the one rotational shaft is rotated by the stocked elastic force, whereby the elastic force stocked in the spiral spring can be output. In this case, the one rotational shaft rotating in the output operation is rotated in the same rotational direction as the other rotational shaft which rotates in the stock or regeneration operation. Therefore, it is unnecessary to provide a mechanism for reversing the rotation of the rotational shaft between the stock (regeneration) operation of the elastic force and the output operation of the elastic force and connecting the rotational shaft to the driving wheel, and thus the construction of the energy stocking mechanism can be simplified.

In this construction, the clutch mechanism may have an output clutch that is provided to one rotational shaft of the first and second rotational shafts, connects the driving wheel and the spiral spring to each other when elastic force stocked in the spiral spring is output, and separates the driving wheel and the spiral spring from each other when power is stocked or regenerated into the spiral spring, and an input clutch that is provided to the other rotational shaft, separates the driving wheel and the spiral spring from each other when the stocked elastic force is output, and connects the driving wheel and the spiral spring to each other when power is regenerated into the spiral spring. According to this construction, the rotation or fixing of the first and second rotational shafts can be simply controlled by the input clutch and the output clutch. Therefore, the stock of elastic force into the spiral spring of the energy stocking mechanism and the output of the elastic force of the spiral spring can be smoothly controlled.

In this construction, the output limiter may continuously or stepwise output the stocked elastic force as power in the range from 0% to 100% to one of the first and second rotational shafts. According to this construction, the elastic force stocked in the spiral spring is prevented from being output at a burst, and the output amount of the elastic force can be controlled. Therefore, the acceleration and the speed of the vehicle can be properly controlled. Furthermore, the driving time of the stocking power source can be reduced by suppressing the output amount of the elastic force, and thus the energy consumption for driving the stocking power source can be reduced.

Furthermore, the vehicle may further comprise a main driving wheel for driving the vehicle main body and a running driving source for driving the main driving wheel, wherein the power stocked in the elastic member of the energy stocking mechanism assists driving force of the running driving source when the vehicle starts running, and the clutch mechanism is switched to a regeneration side when the vehicle is located at a position near to an end point of the predetermined distance so that power from the driving wheel to the elastic member is regenerated while the vehicle is running. According to this construction, the power stocked in the elastic member of the energy stocking mechanism assists the driving force of the running driving source when the vehicle starts running, and thus the running driving source can be designed to be low in power and compact in size, so that weight saving and energy saving can be performed for the vehicle. Furthermore, when the vehicle is near to the end point of the predetermined distance, the clutch mechanism is switched to the regeneration side so that power from the driving wheel into elastic member can be regenerated while the vehicle is running. When the vehicle runs next, the stocking power source may be driven to supplement the energy stocking mechanism with extra elastic force to be added to insufficient elastic force generated by only the regeneration. Accordingly, the power for stocking elastic force in the elastic member can be reduced, and the energy consumption for driving the stocking power source can be reduced, so that energy saving can be performed.

Furthermore, the vehicle may run between stations each of which is provided with the power stocking source, and the energy stocking mechanism may have a coupling unit that is connectable to the power stocking source when the vehicle main body stops at each of the stations.

According to this construction, it is unnecessary to provide the vehicle with the stocking power source for stocking elastic force into the elastic member, and thus the vehicle can be designed to be light in weight and compact in size.

According to another aspect of the present invention, a vehicle system comprises: a vehicle including a vehicle main body, a driving wheel and an energy stocking mechanism having an elastic member that is connected to the driving wheel, converts power of the driving wheel to elastic force, stocks the converted elastic force and outputs the stocked elastic force as power to the driving wheel; and stations at which the vehicle stops, wherein each of the stations has a stocking power source that is connected to the energy stocking mechanism of the vehicle to supply power therefrom into the elastic member of the energy stocking mechanism so that the supplied power is stocked in the elastic member when the vehicle stops at the station.

According to this construction, each station is provided with the stocking power source that is connected to the energy stocking mechanism of the vehicle to stock power into the elastic member of the energy stocking mechanism when the vehicle stops at the station. Therefore, it is unnecessary to provide the vehicle with the stocking power source, and thus the vehicle can be designed to be light in weigh and compact in size. Furthermore, only power may be supplied from the stocking power source of the station to the energy stocking mechanism of the vehicle main body, and thus elastic force can be easily stocked into the elastic member even in a water-wetted field or the like. Furthermore, the stocking power source is not provided to the vehicle main body, but provided to the station. Therefore, when the number of stations is smaller than the number of vehicles, the number of stocking power sources to be installed is reduced, and thus the system construction can be implemented in low cost.

In this construction, the vehicle may have a clutch mechanism for performing a switching operation between output of power from the elastic member of the energy stocking mechanism to the driving wheel of the vehicle and regeneration of power from the driving wheel into the elastic member, and when the vehicle moves between the stations, the vehicle starts running with power stocked in the energy stocking mechanism, and the clutch mechanism is switched to a regeneration side during running so that power is generated from the driving wheel to the elastic member while the vehicle is running. According to this construction, the clutch mechanism is provided to perform the switching operation between the output of the power from the elastic member of the energy stocking mechanism to the driving wheel and the regeneration of power from the driving wheel to the elastic member. Therefore, by switching the clutch mechanism, the power of the driving wheel during running can be regenerated (stocked) as elastic force into the elastic member of the energy stocking mechanism. Therefore, at the station where the vehicle stops, the stocking power source is driven to supplement the elastic member of the energy stocking mechanism with elastic force to be added to insufficient regenerated elastic force. Accordingly, the power for stocking the elastic force into the elastic member can be reduced, and the energy consumption for driving the stocking power source can be reduced, so that energy saving can be performed.

In this construction, the vehicle may further comprise a main driving wheel for driving the vehicle main body and a running driving source for driving the main driving wheel, wherein the power stocked in the elastic member of the energy stocking mechanism assists driving force of the running driving source when the vehicle starts running, and the clutch mechanism is switched to a regeneration side when the vehicle is located at a position near to an end point of the distance between the stations so that power from the driving wheel to the elastic member is regenerated while the vehicle is running. According to this construction, the power stocked in the elastic member of the energy stocking mechanism assists the driving force of the running driving source when the vehicle starts running, and thus the vehicle can be designed to be low in power and compact in size, so that weight saving and energy saving can be performed for the vehicle. Furthermore, the clutch mechanism is switched to the regeneration side when the vehicle is near to the end point of the distance between the stations, thereby enabling regeneration of power from the driving wheel to the elastic member while the vehicle runs. Therefore, at the station where the vehicle stops, the stocking power source is driven to supplement the elastic member of the energy stocking mechanism with elastic force to be added to insufficient elastic force generated by only the regeneration. Accordingly, the power for stocking elastic force into the elastic member can be reduced, and the energy consumption for driving the stocking power source can be reduced, so that energy saving can be performed.

BRIEF DESCRIPTION OF THE DRAWINGS

FIGS. 5A and 5B are diagrams showing the construction of an auxiliary driving unit, wherein FIG. 5A is a partially-omitted plan view of the auxiliary driving unit and FIG. 5B is a partially-omitted side view of FIG. 5A;

FIG. 7 is a diagram showing a conveying system to which the conveying vehicle shown in FIG. 1 is applied;

FIG. 19A is a diagram showing an operation when elastic force is stocked in a spiral spring of an energy stock mechanism, FIG. 19B is a diagram showing an operation when the stocked elastic force is output to an auxiliary driving wheel, and FIG. 19C is a diagram showing an operation when the power (driving force) of the auxiliary driving wheel is regenerated in the spiral spring; and FIG. 20 is a diagram showing the operation of the conveying system.

PREFERRED EMBODIMENTS ACCORDING TO THE PRESENT INVENTION

Preferred embodiments according to the present invention will be described with reference to the accompanying drawings. In the following description, front and rear directions, right and left directions and up and down directions are defined with respect to a vehicle. Furthermore, an arrow FR in the figures represents the forward direction of the vehicle, an arrow R represents the rightward direction of the vehicle, and the arrow UP represents the upward direction of the vehicle.

First Embodiment

Figure 1:
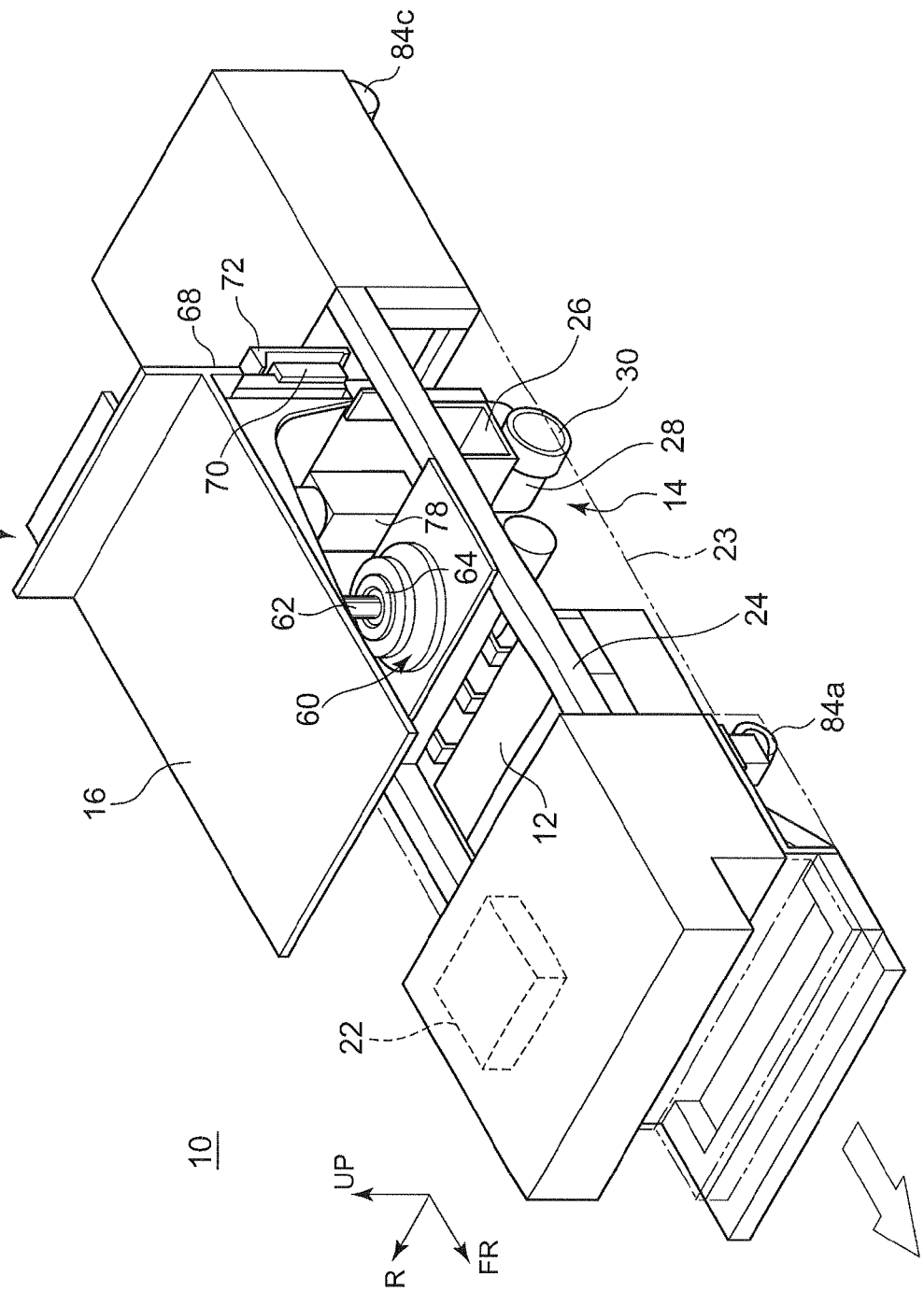
FIG. 1 is a partially-omitted perspective view showing a conveying vehicle as an applied example of a vehicle according to a first embodiment.
Figure 2:
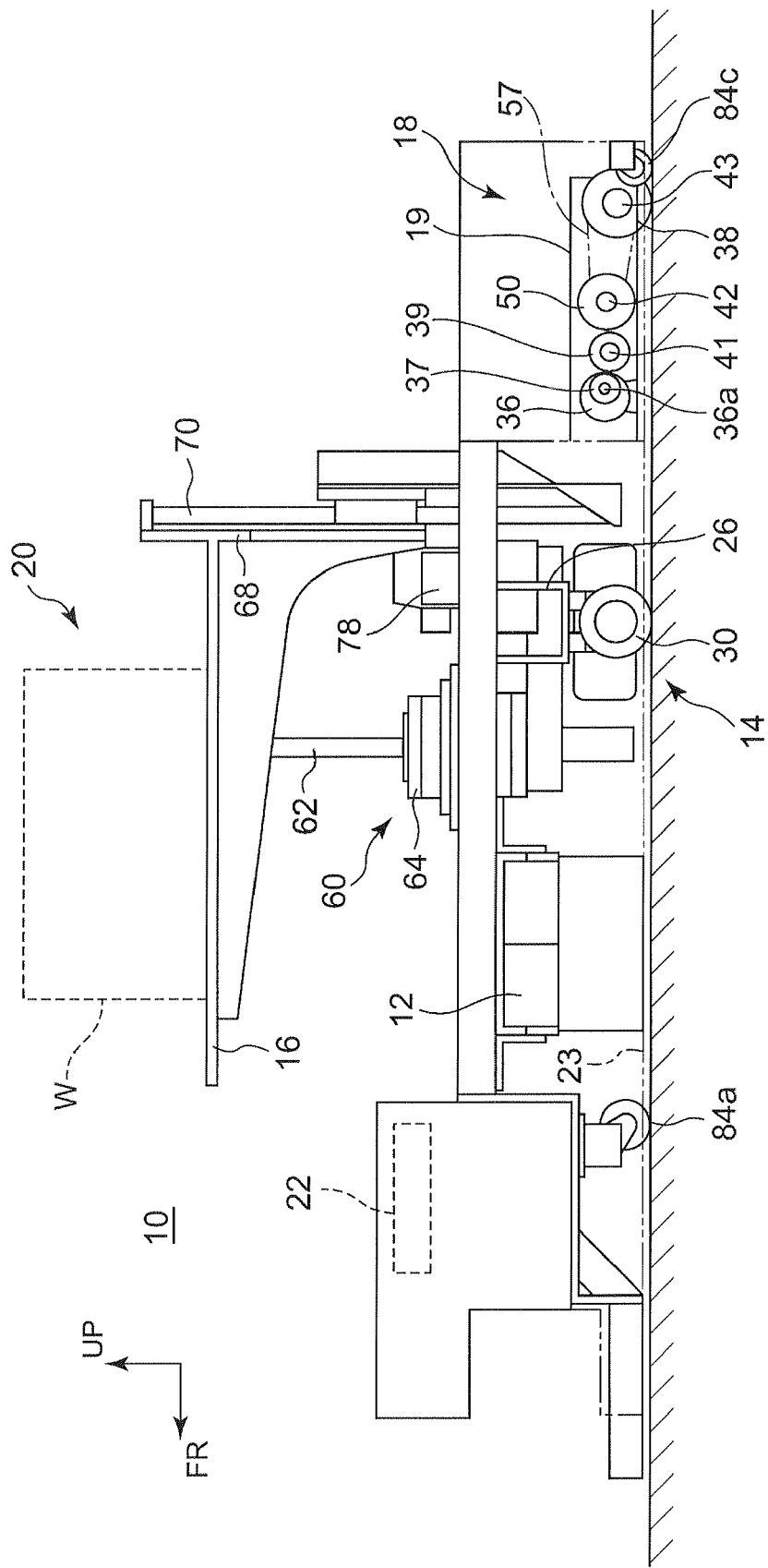
FIG. 2 is a partially-omitted side view of the conveying vehicle shown in FIG. 1.
Figure 3:
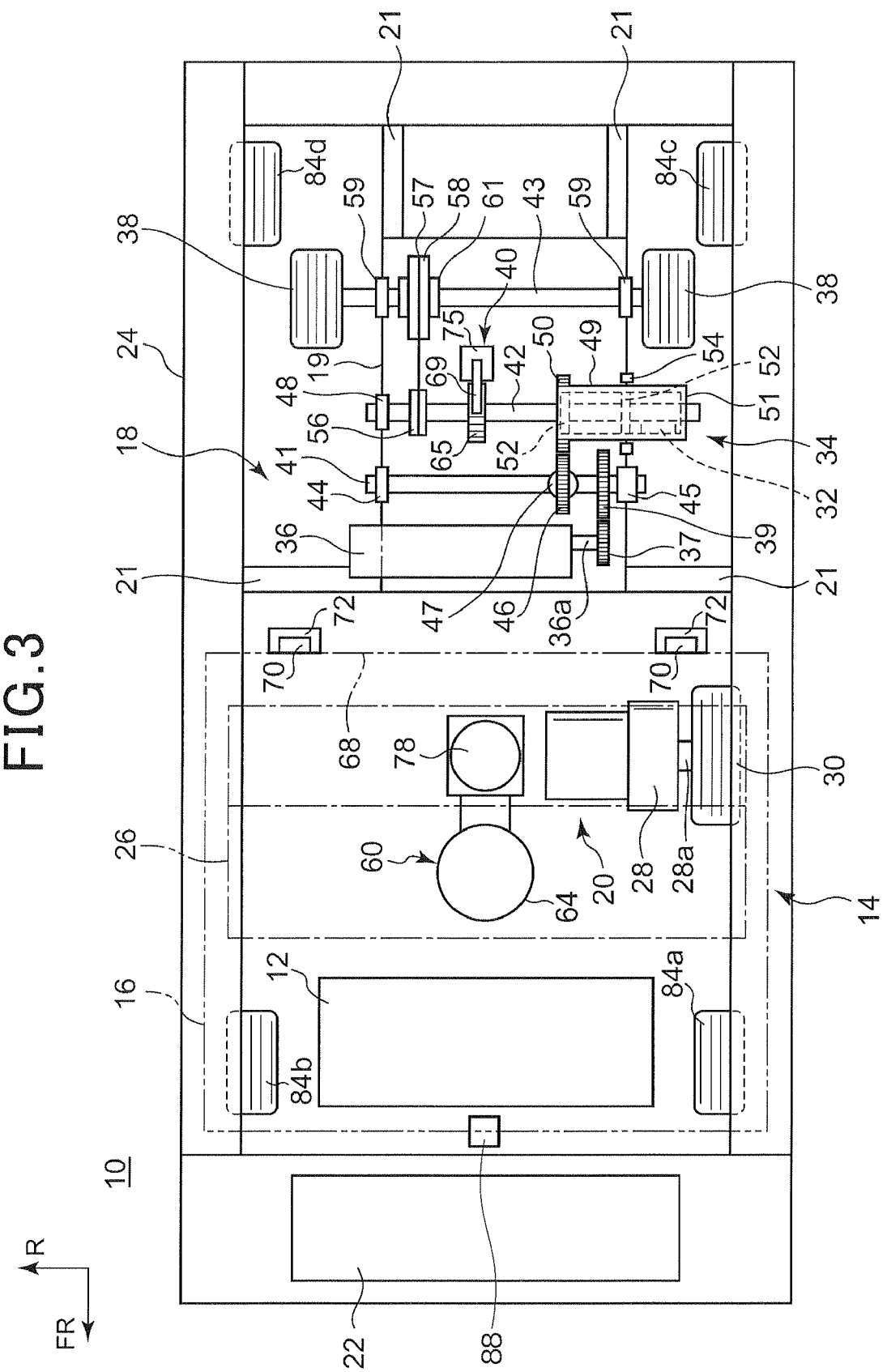
FIG. 3 is a partially-omitted plan view showing a driving system of the conveying vehicle shown in FIG. 1.
Figure 4:
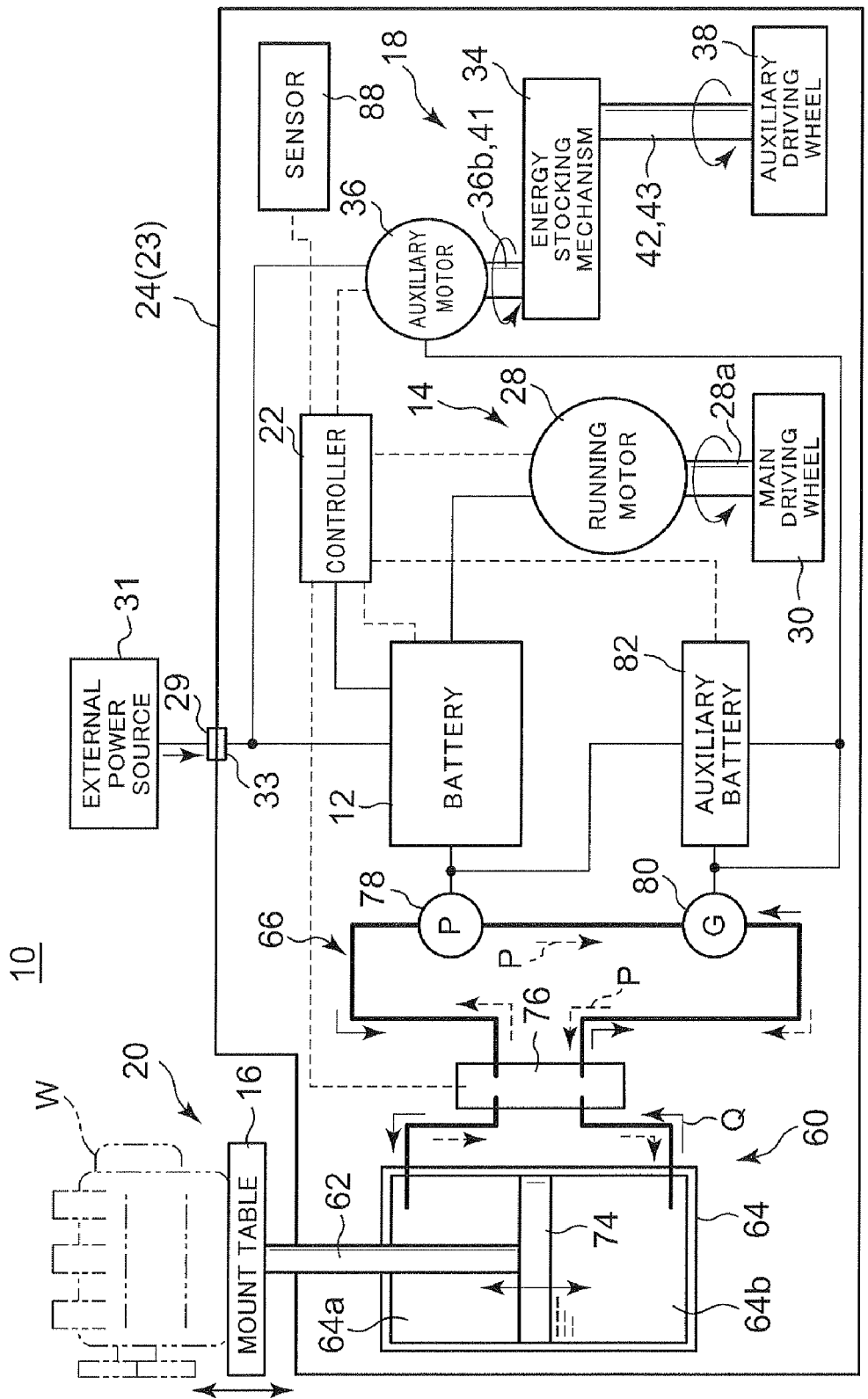
FIG. 4 is a block diagram showing an electrical system and a hydraulic system of the conveying vehicle shown in FIG. 1.

FIG. 1 is a partially-omitted perspective view of a conveying vehicle 10 as an applied example of a vehicle according to a first embodiment, and FIG. 2 is a partially-omitted side view of the conveying vehicle 10 shown in FIG. 1. FIG. 3 is a partially-omitted plan view showing the driving system of the conveying vehicle 10 shown in FIG. 2, and FIG. 4 is a block diagram showing an electrical system and a hydraulic system of the conveying vehicle 10 shown in FIG. 1.

The conveying vehicle 10 is an electrically-operated vehicle which can run on a desired passage with power from a main power unit 14 using a battery (power supply unit) 12 as a power source, and for example, it is an unmanned automated guided vehicle (AGV) having a mount table 16 on which a part (work) such as an engine, a gear box or the like of a vehicle, and conveys the part to a desired position in a factory. In the first embodiment, the conveying vehicle 10 is used as an example of the electrically-operated vehicle, however, any vehicle such as a passenger car, an electrically-operate cart, an electric train or the like may be applied insofar as it can run with electrical power.

The conveying vehicle 10 as described above includes a main driving unit 14 which is driven under normal running, an auxiliary power unit 18 which is driven when the vehicle is started from the stopped state of the conveying vehicle 10 and assists the running (driving) of the vehicle based on the main power unit 14, a mount portion 20 including the mount table 16 on which a work W is mounted, and a controller 22 for comprehensively controlling the operations of the main power unit 14, the auxiliary power unit 18 and the mount portion 20. The respective parts are mounted on a vehicle body frame (vehicle main body) 24 covered by a body 23.

The main power unit 14 has a motor for running (a driving source for running) 28 which is provided substantially at the center portion of the vehicle body frame 24 in the longitudinal direction of the vehicle and supported by a support frame 26 bridged in the vehicle width direction on the vehicle frame 24, a main driving wheel 30 which is rotatably supported through a shaft by the support frame 26 and rotationally driven by the driving shaft 28a of the running motor 28, and a battery 12 for supplying power to the running motor 28.

For example, the battery 12 is charged by an external power source 31 installed in a predetermined station (described later) when the conveying vehicle 10 is stopped at the station to be on standby or perform a work. The conveying vehicle 10 and the external power source 31 are easily electrically connectable to each other through a pair of male and female connectors 29 and 33 which can be detachably fitted to each other by magnetic force, for example (see FIG. 4).

As shown in FIG. 3, the auxiliary power unit 18 has a unit case 19 provided at the rear portion of the vehicle body frame 24 in the longitudinal direction of the vehicle, and the unit case 19 is provided with an energy stocking mechanism 34 having a spiral spring (elastic member) 32 which can convert power (motive energy) to elastic force and stock the elastic force and also output the stocked elastic force as power, an auxiliary (assist) motor (a driving source for stock) 36 for applying power to the energy stocking mechanism 34 to make the spiral spring 32 stock the elastic force, and auxiliary (assist) driving wheels (driving wheels) 38 which are driven with the power based on the elastic force stocked in the energy stocking mechanism 34. The unit case 19 is designed in an box-shape which is longer in the longitudinal direction of the vehicle than in the width direction of the vehicle, and fixed to the vehicle body frame 24 by plural support members 21 extending from the side surface portions of the unit case 19.

As shown in FIGS. 2 and 4, the mount portion 20 has the mount table 16 as a table on which the work W is mounted, and an elevating device 60 which can move the mount table 16 in the up-and-down direction and hold the mount table 16 and the work W at a desired height position.

The elevating device 60 comprises a hydraulic cylinder (elevating mechanism) 64 for elevating the mount table 16 through a rod 62 fixed to the substantially center lower surface of the mount table 16, and a hydraulic circuit 66 (see FIG. 4) for driving the hydraulic cylinder 64. The elevating operation of the mount table 16 is executed while the mount table 16 is guided by rails 70 extending in the up-and-down direction of the vehicle in parallel to the rod 62 at both the sides in the vehicle width direction of a vertical plate 68 provided at the rear portion of the mount table 16, and guide recess portions 72 which are fixed to the vehicle body frame 24 side and slidably fitted to the rails 70.

As shown in FIG. 4, the hydraulic circuit 66 is connected through a control valve mechanism 76 to each of an upper chamber 64a and a lower chamber 64b of a hydraulic cylinder 64 which are compartmented by a piston 74 linked to the rod 62. The control valve mechanism 76 is a valve device for properly switching the intercommunication state with each of the upper chamber 64a and the lower chamber 64b of the hydraulic circuit 66 and also properly switching the flow direction of operating oil, and the operation of the control valve mechanism 76 is controlled by the controller 22.

A pump 78 for pressurizing and fluidizing the operating oil in the circuit and a generator (electric generator) 80 which receives the pressure or flow of the operating oil to generate electric power are disposed in the hydraulic circuit 66. The power generated by the generator 80 is charged in an auxiliary battery 82 comprising an electricity storage element such as a capacitor or the like, a secondary battery or the like, and then used as driving power for the pump 78. When the power of the auxiliary battery 82 is insufficient for the driving power of the pump 78, the battery 12 may be used. Furthermore, it is needless to say that the auxiliary battery 82 is not provided and the power generated in the generator 80 is charged in the battery 12. In this case, the weight of the conveying vehicle 10 is reduced by only the weight of the removed auxiliary battery 82.

The conveying vehicle 10 as described above runs by properly driving the main driving wheel 30 and the auxiliary driving wheels 38 under the control of the controller 22. However, wheels 84a to 84d which are driven and rotated during the running of the vehicle based on the main driving wheel 30 and the auxiliary driving wheels 38 are further supported through shafts by the vehicle body frame 24 (see FIG. 3). The wheels 84a and 84b serving as the front wheels in the forward running direction (the direction of the arrow in FIG. 1) of the conveying vehicle 10 may be made to function as steering wheels steered under the control of the controller 22, for example, or the wheels 84c and 84d serving as the rear wheels may be made to function as steering wheels.

Furthermore, a sensor 88 (see FIG. 3) for detecting the magnetic field of a magnetic tape 86 (see FIG. 7) which is attached onto a passage on which the conveying vehicle 10 runs in a factory and guides the conveying vehicle 10 is provided at the vehicle bottom surface side of the conveying vehicle 10. Accordingly, the conveying vehicle 10 can be magnetically induced. In place of the above method of guiding the conveying vehicle 10, a method of laying down a rail on the floor surface and inducing the conveying vehicle along the rail or other methods may be used.

Next, the auxiliary power unit 18 will be described. FIG. 5 is a diagram showing the construction of the auxiliary power unit 18, FIG. 5A is a partially-omitted plan view of the auxiliary power unit 18, and FIG. 5B is a partially-omitted side view of FIG. 5A.

As described above, the auxiliary power unit 18 has the unit case 19 designed to be long in the longitudinal direction of the conveying vehicle 10, and the auxiliary motor 36 is disposed in the unit case 19 as shown in FIG. 5. Furthermore, an intermediate shaft 41, a main shaft 42 and a driving shaft 43 which are disposed substantially in parallel to the axial line of the auxiliary motor 36 are rotatably supported through shafts by the confronting side surface portions 19A and 19B of the unit case 19.

The auxiliary motor 36 is fixed to the bottom surface portion 19C of the unit case 19, and projects to the outside of the unit case 19 through a cutout formed in one side surface portion 19A of the unit case 19. A first gear 37 is fixed to the motor shaft 36a of the auxiliary motor 36, and the first gear 37 is engaged with a second gear 39 fixed to the intermediate shaft 41.

One end of the intermediate shaft 41 is journaled by a bearing portion 44 secured to one side surface portion 19A of the unit case 19, and the other end of the intermediate shaft 41 is journaled by a first one-way clutch 45 secured to the other side surface portion 19B of the unit case 19. This first one-way clutch 45 is a mechanical type clutch, and only when the intermediate shaft 41 rotates in the same direction as the normal rotation direction (the rotational direction of the intermediate shaft 41 by the driving of the auxiliary motor 36), the first one-way clutch 45 permits the rotation of the intermediate shaft 41, whereby the intermediate shaft 41 is prevented from being rotated in the opposite direction. Specifically, when the intermediate shaft 41 is about to rotate in the opposite direction, the first one-way clutch 45 is fitted to the unit case 19, thereby preventing the rotation of the intermediate shaft 41 in the opposite direction.

Furthermore, the intermediate shaft 41 is provided with a third gear d46 disposed between the second gear 39 and the bearing portion 44, and the third gear 46 has a torque limiter 47 between the third gear 46 and the intermediate shaft 41. The torque limiter 47 makes the third gear 46 run idle with respect to the intermediate shaft 41 when external force (torque) of a predetermined value or more occurs in the third gear 46, and prevents overload on the auxiliary motor 36.

One end of the main shaft 42 is journaled by a bearing portion 48 secured to one side surface portion 19A of the unit case 19, and the other end side of the main shaft 42 is journaled by the energy stocking mechanism 34. Furthermore, in this construction, the energy stocking mechanism 34 is rotatably supported through a shaft on the other side surface portion 19B of the unit case 19.

Specifically, the energy stocking mechanism 34 has a main body portion 49, a fourth gear 50 fixed to the main body portion 49, and a casing 51 for accommodating the spiral spring 32 as described above. A through hole 49A through which the main shaft 42 penetrates is formed in the main body portion 49, and the main shaft 42 is supported in the through hole 49A through a pair of bearing portions 52.

Furthermore, the fourth gear 50 which is engaged with the third gear 46 of the intermediate shaft 41 is fitted in the outer peripheral portion at one end side of the main body portion 49, and the fourth gear 50 and the main body portion 49C are fixed to each other through bolts 53. Furthermore, a bearing portion 54 is provided to the outer peripheral portion 49C at the other end side of the main body portion 49, and the bearing portion 54 is secured to the other side surface portion 19B of the unit case 19, whereby the main body portion 49 is rotatable independently of the main shaft 42.

The end surface 49D at the other end side of the main body portion 49 projects slightly outwardly as compared with the other side surface portion 19B of the unit case 19, and the casing 51 is fixed to the end surface 49D at the other end side by a bolt 55. Therefore, the casing 51 and the main body portion 49 are rotated integrally with each other.

The scroll type spiral spring 32 is mounted in the casing 51, and one end of the spiral spring 32 is fixed to the inner wall surface 51A of the casing 51, and the other end of the spiral spring 32 is fixed to the outer periphery of the shaft end portion of the main shaft 42. Accordingly, the spiral spring 32 is wound around the main shaft 42 on the basis of the rotation of the main shaft 42 or the casing 51. In the first embodiment, the inner wall surface 51A of the casing 51 extends in parallel to the shaft end portion 41A of the main shaft 42, and functions as a parallel portion which rotates around the main shaft 42 interlockingly with the auxiliary motor 36.

The main shaft 42 is provided with a stopper mechanism (output limiter) 40 for stopping the rotation of the main shaft 42 and a first sprocket 56 between the energy stocking mechanism 34 and the bearing portion 48. The first sprocket 56 is linked to a second sprocket 58 of the driving shaft 43 through a chain 57. One side surface portion 19A of the unit case 19 is provided with a tensioner 63 for adjusting the tension of the chain 57 suspended between the first sprocket 56 and the second sprocket 58.

The driving shaft 43 is journaled at both the side surface portions 19A and 19B of the unit case 19 by a pair of bearing portions 59, and the auxiliary driving wheels 38 are secured to both the shaft end portions of the driving shaft 43. A second one-way clutch 61 is provided between the driving shaft 43 and the second sprocket 58. The second one-way clutch 61 is a mechanical clutch which is engaged with the driving shaft 43 when the second sprocket 58 is rotated in the normal rotational direction (the rotational direction based on the output of the energy stocking mechanism 34) and releases the engagement thereof and slips when the second sprocket 58 is rotated in the opposite rotational direction.

The stopper mechanism 40 has a gear body (gear) 65 fixed to the main shaft 42, and a ratchet portion (ratchet) 67 which is swung so as to be freely engageable with the gear portion 65A of the gear body 65. In FIG. 5B, the gear portion 65A is illustrated as being formed at a part of the outer periphery of the gear body 65 for the sake of simplicity of drawing, however, the gear portion 65A is formed over the whole periphery of the gear body 65 in the first embodiment.

The ratchet portion 67 has a ratchet body 69 which is formed at the tip portion of the ratchet portion 67 so as to be engaged with the gear portion 65A, and the ratchet body 69 is freely swingably supported by a support portion 71 erected from the bottom surface portion 19C of the unit case 19. Specifically, a pair of confronting support pieces 71A and 71B are formed at the upper portion of the support portion 71, and substantially the center portion 69B of the ratchet body 69 is supported between the support pieces 71A and 71B through a joint pin 73.

Furthermore, the solenoid actuator 75 is secured at the lower side of the support portion 71. The solenoid actuator 75 makes the shaft portion 75A freely movable in the up-and-down direction by supplying power to a coil (not shown) of the solenoid actuator 75 under the control of the controller 22, and the tip of the shaft portion 75A is linked to the base end portion 69C of the ratchet body 69.

Normally (when no power is supplied to the coil), the solenoid actuator 75 is urged by a coil spring (not shown) or the like so that the shaft portion 75A is downwardly moved, for example. Accordingly, the ratchet body 69 is swung around the joint pin 73 so that the pawl 69A is separated from the gear portion 65A as indicated by a broken line in FIG. 5B, so that the lock of the main shaft 42 by the ratchet body 69 is released and thus the main shaft 42 is freely rotatable.

On the other hand, by supplying power to the coil of the solenoid actuator 75, the solenoid actuator 75 generates force for pushing the shaft portion 75A upwardly, and thus the shaft portion 75A is upwardly moved against the urging force of the coil spring. Accordingly, as indicated by a solid line in FIG. 5B, in the ratchet body 69, the pawl 69A is engaged with the gear portion 65A of the gear body 65, so that the main shaft 42 is locked and thus is not rotated.

Next, the running operation of the conveying vehicle 10 according to the first embodiment will be described.

Under the control of the controller 22, the conveying vehicle 10 is basically controlled to run (starts running) by using the auxiliary power unit 18 when it starts running from the stopped state, and also run by using the main power unit 14 when it normally runs after the start of running.

For example, when the conveying vehicle 10 is stopped at a standby station or a working station (described later), the battery 12 of the conveying vehicle 10 is charged by an external power source 31 provided to the standby station or the working station. Here, when the conveying vehicle 10 runs (starts running) by using the auxiliary power unit 18, the controller 22 drives the auxiliary motor 36 with power form the external power source 31.

At this time, the controller 22 sets the solenoid actuator 75 to an operating state (ON). That is, by actuating the solenoid actuator 75, the shaft portion 75A is moved upwardly, and the pawl 69A of the ratchet body 69 is engaged with the gear portion 65A of the gear body 65. Therefore, the main shaft 42 is locked so that it does not rotate.

Figure 6A:
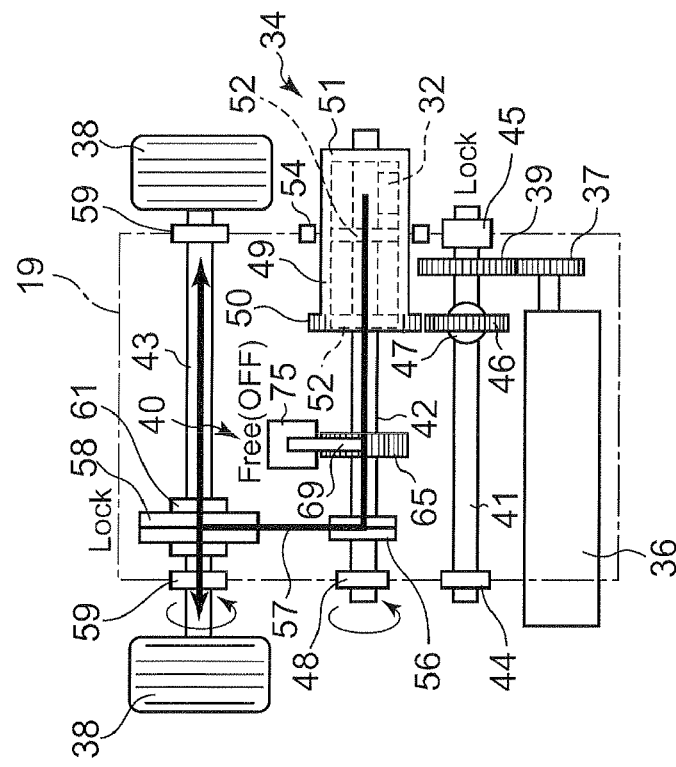
FIG. 6A is a diagram showing an operation when elastic force is stocked in a spiral spring of an energy stocking mechanism.

When the auxiliary motor 36 is driven under the state that the main shaft 42 is locked, the rotation of the normal direction of the auxiliary motor 36 is transmitted to the first gear 37, the second gear 39, the intermediate shaft 41, the third gear 46 and the fourth gear 50 as shown in FIG. 6a. The fourth gear 50 is fixed to the main body portion 49 of the energy stocking mechanism. 34 and the casing 51, and thus the casing 51 is rotted integrally with the fourth gear 50, so that the spiral spring 32 is wound up around the main shaft 42. Here, when the spiral spring 32 is excessively wound up, the torque limiter 47 disposed between the third gear 46 and the intermediate shaft 41 runs idle, and thus the overload on the auxiliary motor 36 is prevented.

Under this state, elastic force for rotating the casing 51 in the reverse rotational direction occurs in the spiral spring 32. In the first embodiment, the intermediate shaft 41 is provided with the one-way clutch 45 for preventing this reverse rotation of the intermediate shaft 41, and thus the casing 51 which is gear-linked to the intermediate shaft 41 is fixed (hold) so as not to rotate in the reverse rotational direction. As described above, the power (driving force or rotational torque) of the auxiliary motor 36 is converted to the elastic force of the spiral spring 32 and stocked in the energy stocking mechanism 34.

Subsequently, after the charging of the battery 12 by the external power source 21 and also the stock of the elastic force in the energy stocking mechanism 34 are completed, the controller 22 starts running (drives forward) on the basis of a running (running starting) instruction. Specifically, the controller 22 sets the solenoid actuator 75 to the stopped state (OFF) when receiving the running start instruction.

Figure 6B:
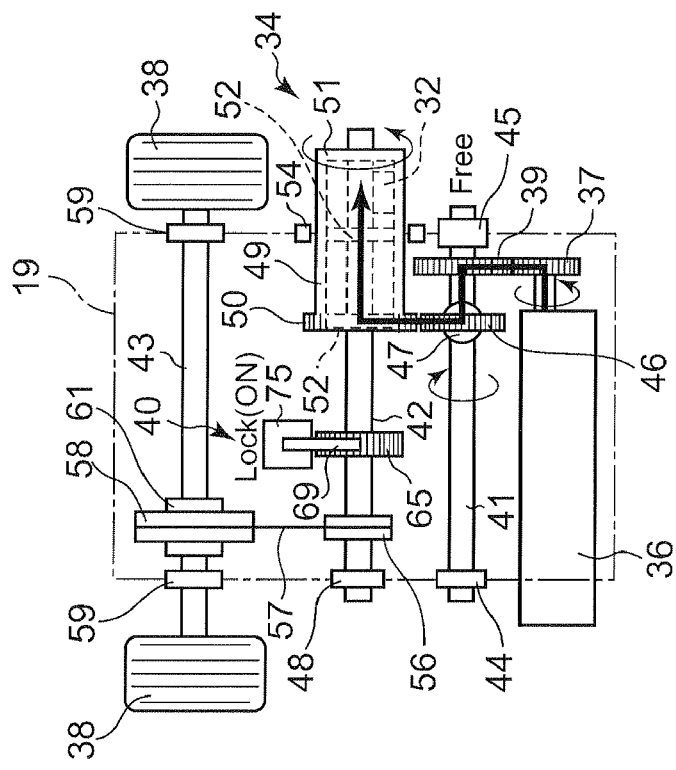
FIG. 6B is a diagram showing an operation when the stocked elastic force is output to an auxiliary driving wheel.

When the solenoid actuator 75 is stopped, the pawl 69A of the ratchet body 69 is separated from the gear portion 65A, and thus the lock of the main shaft 42 is released. Therefore, as shown in FIG. 6B, the elastic force of the spiral spring 32 is released, so that the main shaft 42 is rotated roundly. Here, the rotation of the casing 51 in the reverse rotational direction is regulated by the first one-way clutch 45, and thus the main shaft 42 is rotated normally (in the forward rotational direction) as in the case of the casing 51 under the stocked state.

According to this construction, the rotational direction of the casing under the stocking state that the elastic force is being stocked in the spiral spring 32 can be made identical to the rotational direction of the main shaft 42 when the elastic force is being output. Therefore, the stock of elastic force into the energy stocking mechanism 34 or the output of the elastic force concerned can be smoothly performed.

The rotational driving force of the main shaft 42 is transmitted to the driving shaft 43 through the first sprocket 56, the chain 57, the second sprocket 58 and the second one-way clutch 61, and thus the driving shaft 43 is rotated, whereby the auxiliary driving wheels 38 are rotated in such a direction as to move the conveying vehicle 10 forwardly, and thus the conveying vehicle 10 starts running.

Here, for example, an electromagnetic brake may be adopted as the stopper mechanism 40 for fixing the rotation of the main shaft 42. However, the rotational torque transmitted to the main shaft 42 varies in accordance with the characteristic of the spiral spring 32 of the energy stocking mechanism 34 or the residual amount of the stock, and thus it is required to make a strict selection of brake to the spiral spring in the construction adopting the electromagnetic brake, so that the construction of the stopper mechanism is complicated and the product cost increases.

In the first embodiment, the stopper mechanism 40 comprises the gear body 65 fixed to the main shaft 42 and the ratchet portion 67 which is swung so as to be freely engageable with the gear portion 65A of the gear body 65. In this construction, the ratchet portion 67 is swung irrespective of the characteristic of the spiral spring 32 so that the ratchet portion 67 is engaged with the gear portion 65A when the rotation of the main shaft 42 is fixed, and the pawl 69A of the ratchet portion 67 is separated from the gear portion 65A when the main shaft 42 is rotated. Therefore, the construction of the stopper mechanism 40 can be simplified, and the manufacturing cost can be reduced. In addition, the stock of elastic force in the energy stocking mechanism 34 or the output of the elastic force concerned can be performed by a simple operation of swinging the ratchet portion 67.

In the first embodiment, the controller 22 controls the solenoid actuator 75 so that the ratchet body 69 is engaged with the gear portion 65A when a desired time (for example, five seconds) elapses from the start of running of the conveying vehicle 10. According to this operation, since the elastic force stocked in the energy stocking mechanism 34 can be exclusively used for acceleration, the use efficiency of the elastic force can be enhanced, and the frequency of the winding frequency of the spiral spring at the standby station or the working station can be reduced.

Furthermore, the control of the stopper mechanism 40 can be arbitrarily changed. For example, the ratchet body 60 may be engaged with the gear portion 65A at the time point when the speed of the conveying vehicle 10 reaches a desired speed, or a desired time may be measured from the time point when the speed of the conveying vehicle 10 reaches the desired speed. In this case, the speed of the conveying vehicle may be determined by detecting the rotational number of the driving shaft 43 and calculating the vehicle speed from the detected rotational number.

At the running start stage based on the auxiliary power unit 18, the main shaft 42 is rotated to apply rotational torque to the auxiliary driving wheels 38 at least until the elastic force stocked in the spiral spring 32 is released. In the first embodiment, the second one-way clutch 61 is provided between the driving shaft 43 and the second sprocket 58. Accordingly, even when the elastic force stocked in the spiral spring 32 is released and the rotational speed of the main shaft 42 is reduced to be lower than the rotational speed of the driving shaft 43, the second one-way clutch 61 slips, so that the rotation of the driving shaft 43 is continued and the conveying vehicle 10 can run at some distance by the inertial force thereof. Accordingly, the conveying vehicle 10 can run with only the elastic force stocked in the spiral spring 32 of the energy stocking mechanism 34 among working stations in a factory by designing the conveying vehicle 10 in consideration of the vehicle weight of the conveying vehicle 10 containing a work to be conveyed, the characteristic of the spiral spring, losses of the respective bearings, etc., for example.

A clutch (not shown) may be disposed between the driving shaft 28a of the running motor 28 and the main driving wheel 30 so that the clutch concerned is set to a separation state when the conveying vehicle 10 starts running by the auxiliary power unit 18. In this case, the load on the running motor 28 which is not used at the running start time can be reduced, and also the load from the running motor 28 can be effectively suppressed from affecting the running starting operation.

When the running of the conveying vehicle 10 is continued after the start of running based on the auxiliary power unit 18, the controller 22 drives the main power unit 14, and drives the running motor 28 with the power from the battery 12, whereby the conveying vehicle can continuously run as a normal electrically-operated vehicle.

As described above, according to the conveying vehicle 10 according to the first embodiment, the auxiliary driving wheels 38 are driven by the elastic force stocked in the spiral spring 32 of the energy stocking mechanism 34, whereby the conveying vehicle 10 can start running from the stopped state thereof. In this case, the auxiliary motor 36 which winds up the spiral spring 32 is driven by the external power source 31 when the conveying vehicle 10 is stopped, and thus it is unnecessary to consume the battery 12. In addition, the battery 12 is charged by the external power source 31 at the same time, so that no time loss occurs. Furthermore after the conveying vehicle 10 starts running by the auxiliary power unit 18, the conveying vehicle 10 electrically runs by the main power unit as in the case of a general electrically-operated vehicle, so that the conveying vehicle 10 can run on a desired passage by a desired distance.

Furthermore, in general, the power amount (current amount) of the motor under low-speed rotation is larger than that under predetermined high-speed rotation, and also the driving torque required to start running from a stopped state is very larger than the driving torque under a stationary running state. In other words, if the conveying vehicle 10 is made to start running by using the running motor 28, the running motor 28 must rotate at a low speed and output a high torque. Therefore, the power consumption thereof would be extremely larger that the power consumption of the auxiliary motor 36 for winding the spiral spring 32.

On the other hand, the start of running of the conveying vehicle 10 can be covered by the elastic force of the spiral spring 32, and thus a low-power and compact motor can be used as the running motor 28. Particularly, with respect to the conveying vehicle 10 which is also required to convey a work as a heavy load, the load associated with the start of running is very large, and the effect thereof is remarkable. Furthermore, in the conveying vehicle 10, it is hardly required to use the battery 12 at the running start time. Therefore, the battery 12 can be designed to be small in capacity and compact in size, and thus weight saving and energy saving for the conveying vehicle 10 can be performed. In addition, since the spiral spring is used as the elastic member constituting the energy stocking mechanism 34, the auxiliary power unit 18 can be constructed simply and in low cost.

In the conveying vehicle 10 of the first embodiment, the conveying vehicle 10 according to this invention can be made to run by selectively driving the main power unit 14 and the auxiliary power unit 18 as described above, whereby the energy saving can be more greatly performed as compared with the normal electrically-operated vehicle. With respect to the elevating device 60 constituting the mount portion 20 on which a work is mounted, it is provided with the generator 80, the auxiliary battery 82, etc., whereby energy saving can be further greatly enhanced.

That is, in the elevating device 60, before the work W is mounted on the mount table 16, under the control of the controller 22, the control valve mechanism 76 is first switched and the pump 78 is driven, and oil pressure is applied in the hydraulic circuit 66 in a direction of a broken-line arrow P in FIG. 4. Accordingly, the lower chamber 64*b* is pressurized, and the mount table 16 is upwardly moved to a desired height position through the piston 74.

Subsequently, the work W is mounted on the mount table 16. At this time, by preventing leakage of hydraulic pressure from the lower chamber 64*b* through the control valve mechanism 76 and keeping the pressurized state, the height position of the work W can be kept easily and with saved power without keeping the driving of the pump 78.

When the work W is mounted on the mount table 16 or the work W held at the desired height position is downwardly moved, the control valve mechanism 76 is properly controlled so that the mount table 16 is downwardly moved by the weight of the work W and the mount table 16 without driving the pump 78. That is, the control valve mechanism 76 is controlled to be switched so that the operating oil can flow out from the lower chamber 64*b* and the flow-out operating oil flows through the hydraulic circuit 66 in the direction of a solid-line arrow Q. Accordingly, the operating oil flows out from the lower chamber 64*b* which is compressed due to the downward movement of the piston 74 in connection with the downward movement of the work W and the mount table 16, so that a vane wheel (not shown) or the like of the generator 80 is rotated to generate power and the generated power is stocked in the auxiliary battery 82.

In the elevating device 60, the pump 78 is driven with the stocked power from the auxiliary battery 82, and the mount table 16 can be returned to the desired height position. When the power from the auxiliary battery 82 is insufficient to return the mount table 16 to the desired height position, the battery 12 may be used in combination.

As described above, in the elevating device 60, power can be generated in the generator 80 by using the weight of the work W and the weight of the mount table 16, and utilized as a driving source of the pump 78 which is used to move the mount table 16 upwardly again through the auxiliary battery 82. That is, the elevating device 60 has an energy regenerating mechanism for regenerating the potential energy of the work W mounted on the mount table 16 at the desired height position as electrical energy by using the hydraulic circuit 66 and the generator 80, and charging the auxiliary battery 82. Therefore, basically, the energy required to move the mount table 16 upwardly and downwardly can be covered by the elevating device 60 itself.

Accordingly, the conveying vehicle 10 has the elevating device 60 having the energy regenerating mechanism described above, and thus it is unnecessary to use power of the battery 12 or the like as elevating energy of the mount table 16. Therefore, the battery 12 can be designed to be smaller in capacity and more compact in size, and thus the energy saving of the conveying vehicle 10 can be more greatly enhanced.

As shown in FIG. 4, in the conveying vehicle 10, the electrical energy which is regenerated by the elevating device 60 and output from the generator 80 may be used not only to charge the auxiliary battery 82, but also to derive the auxiliary motor 36 of the auxiliary power unit 18. Accordingly, even when it is unnecessary to charge the battery 12 under the stopped state or no external power source 31 is provided to a station or the like at which the conveying vehicle is stopped, the auxiliary motor 36 may be driven with the power from the auxiliary battery 82 without using any power from the battery 12 to stock elastic force in the energy stocking mechanism 34.

In addition, the mount table 16 on which the work W is mounted may be downwardly moved at a desired timing to generate power when the conveying vehicle 10 is stopped, whereby the power from the generator 80 is supplied to the auxiliary motor 36 to stock elastic force in the spiral spring 32 when the conveying vehicle 10 is stopped. That is, at the stop time of the conveying vehicle 10, the loading of the work W onto the mount table 16 and the stock of elastic force into the spiral spring 32 can be simultaneously performed, and after the work W is loaded, the quick start of running by the auxiliary power unit 18 can be performed. Therefore, further energy saving and speed-up of the conveying work can be performed.

Next, the conveying system 100 to which the conveying vehicle 10 according to the first embodiment is applied will be described.

As shown in FIG. 7, in the conveying system 100, predetermined works are performed at respective working stations 102*a* to 102*c* while plural conveying vehicles 10 run a passage guided by a magnetic tape 86 laid down in a factory.

First, a conveying vehicle 10 which is on standby at a standby station 104 of the conveying system 100 is supplied with power from the external power source 31 to charge the battery 12 and stock elastic force in the energy stocking mechanism 34. After the charging of the battery 12 and the stocking of the elastic force in the energy stocking mechanism 34 are completed, the conveying vehicle 10 concerned starts running by using the auxiliary power unit 18 as a driving source. The conveying vehicle 10 which starts running is guided by a magnetic tape 86 by detecting magnetic field through a sensor 88 under the control of the controller 22, and reaches a first work station 102*a*. When the distance between the standby station 104 and the work station 102*a* is within a sufficiently reachable distance at which the conveying vehicle starting from the standby station 104 reaches the work station 102*a* by only the power of the auxiliary power unit 18, it is unnecessary to drive the main power unit 14 after the conveying vehicle 10 starts running, and thus the power can be extremely saved. The same is applied to the movement between the following respective work stations.

Subsequently, for example, a work W such as a vehicle engine or the like is loaded onto the mount table 16 of the conveying vehicle 10 reaching the work station 102*a* by a working robot 106*a* provided to the work station 102*a*. Furthermore, in the elevating device 60, energy is regenerated by using the weight of the work W to charge the auxiliary battery 82 as occasion demands.

When power generation is executed in the elevating device 60 substantially simultaneously with the loading of the work W, the auxiliary motor 36 may be driven with the generated power, and elastic force can be stocked in the energy stocking mechanism 34. In some cases, the external power source 31 may be omitted from the work station 102*a*.

The conveying vehicle 10 on which the work W is loaded starts running by using the auxiliary power unit 18 as the driving source, and reaches the second work station 102*b*. At the second work station 102*b*, for example, a desired part (not shown) is assembled with the work W conveyed from the work station 102*a* by a working robot 106*b*.

Subsequently, when the conveying vehicle 10 reaches the third work station 102*c*, for example, a working robot 106*c* conveys the work W assembled with the desired part from the mount table 16. At the same time, elastic force is stocked in the energy stocking mechanism by the external power source 31 again.

Thereafter, the conveying vehicle 10 starting from the work station 102c runs on a passage along which it returns to the standby station 104 again. At this time, by driving the main power unit 14 after the running start based on the auxiliary power unit 18, the convey vehicle 10 can easily come back to the standby station 104 even when the distance of the return passage to the standby station 104 is relatively long. The conveying vehicle 10 returning to the standby station 104 is supplied with power from the external power source 31 again, and charging of the battery 12 and the stock of elastic force in the energy stocking mechanism 34 are performed. Furthermore, by driving the elevating device 60 with the auxiliary battery 82 charged at the work station 102a, the mount table 16 can be upwardly moved to a desired height position.

As described above, in the conveying system 100, the conveying vehicle 10 can move between the respective work stations or the like with only the power of the auxiliary power unit 18, and thus the work can be performed with extremely saved power. Of course, the main power unit 14 can be driven during the movement between the respective work stations or the like as occasion demands.

In addition, the conveying vehicle 10 can run by using the running motor 28 as in the case of the normal electrically-operated vehicle. Therefore, even when the running passage is relatively long, the conveying vehicle can surely move on the running passage, and the degree of freedom of the design of the moving passage can be enhanced. Therefore, as indicated by a broken line of FIG. 7, the running passage of the conveying vehicle 10 can be easily changed by re-attaching the magnetic tape 86 and slightly changing the control program of the controller 22.

As described above, according to the first embodiment, the auxiliary motor 36 for applying power to the energy stock mechanism 34 to stock elastic force in the spiral spring 32 is provided. Therefore, by driving the auxiliary motor 36, elastic force can be stocked in the spiral spring 32 of the energy stocking mechanism 34 in advance at a work station or the like, and the conveying vehicle 10 is enabled to run on a desired moving passage by using the elastic force concerned. Furthermore, there is provided the stopper mechanism 40 for holding the energy stocking mechanism 34 under the state that elastic force is stocked in the spiral spring 32, and also releasing the holding to output the elastic force when the conveying vehicle starts running. Therefore, the elastic force stocked in the spiral spring 32 can be used at any desired time by a desired amount, and the operation of starting running can be facilitated.

Furthermore, according to the first embodiment, the stopper mechanism 40 has the gear body 65 formed in the main shaft 42 linked to the auxiliary driving wheels 38, and the ratchet portion 67 which has the pawl 69A engaged with the gear portion 65A of the gear body 65 to lock the main shaft 42 when elastic force is stocked, and is swung so that the pawl 69A is separated form the gear portion 65A when the elastic force is output. Therefore, the construction of the stopper mechanism 40 can be simplified. In addition, the stock of elastic force into the energy stocking mechanism 34 or the output of the elastic force concerned can be performed by a simple operation of swinging the ratchet portion 67.

Still furthermore, according to the first embodiment, the energy stocking mechanism 34 has the spiral spring 32 which is wound up around the main shaft 42 joined to the auxiliary driving wheels 38, one end of the spiral spring 32 is joined to the outer periphery of the shaft end portion of the main shaft 42, and the other end of the spiral spring 32 extends in parallel to the shaft end portion of the main shaft 42 and is joined to the inner wall surface 51A of the casing 51 which rotates around the main shaft 42 interlockingly with the auxiliary motor 36. Therefore, the rotational direction of the casing 51 when elastic force is stocked in the spiral spring 32 can be made identical to the rotational direction of the main shaft 42 when the elastic force concerned is output. Therefore, the stock of elastic force into the energy stocking mechanism 34 or the output of the elastic force concerned can be smoothly performed.

According to the first embodiment, the elastic force is output as power when the conveying vehicle 10 starts running, and also the controller 22 controls the stopper mechanism 40 so that the rotation of the main shaft 42 is locked when a desired time containing zero elapses after the speed of the conveying vehicle 10 reaches a desired speed containing zero. Therefore, the stocked elastic force can be used for only acceleration of the vehicle. Therefore, the use efficiency of the elastic force can be enhanced, and the frequency of the wind-up work at the work station or the like can be reduced.

Furthermore, according to the first embodiment, the main driving wheel 30 for driving the vehicle body frame 24 and the running motor 28 for driving the main driving wheel 30 are provided, and the power stocked in the spiral spring of the energy stocking mechanism 34 assists the driving force of the running motor 28 when the vehicle starts running. Therefore, a low-power and compact motor can be used as the running motor 28, and the weight saving and energy saving of the conveying vehicle 10 can be performed.

Second Embodiment

Figure 8:
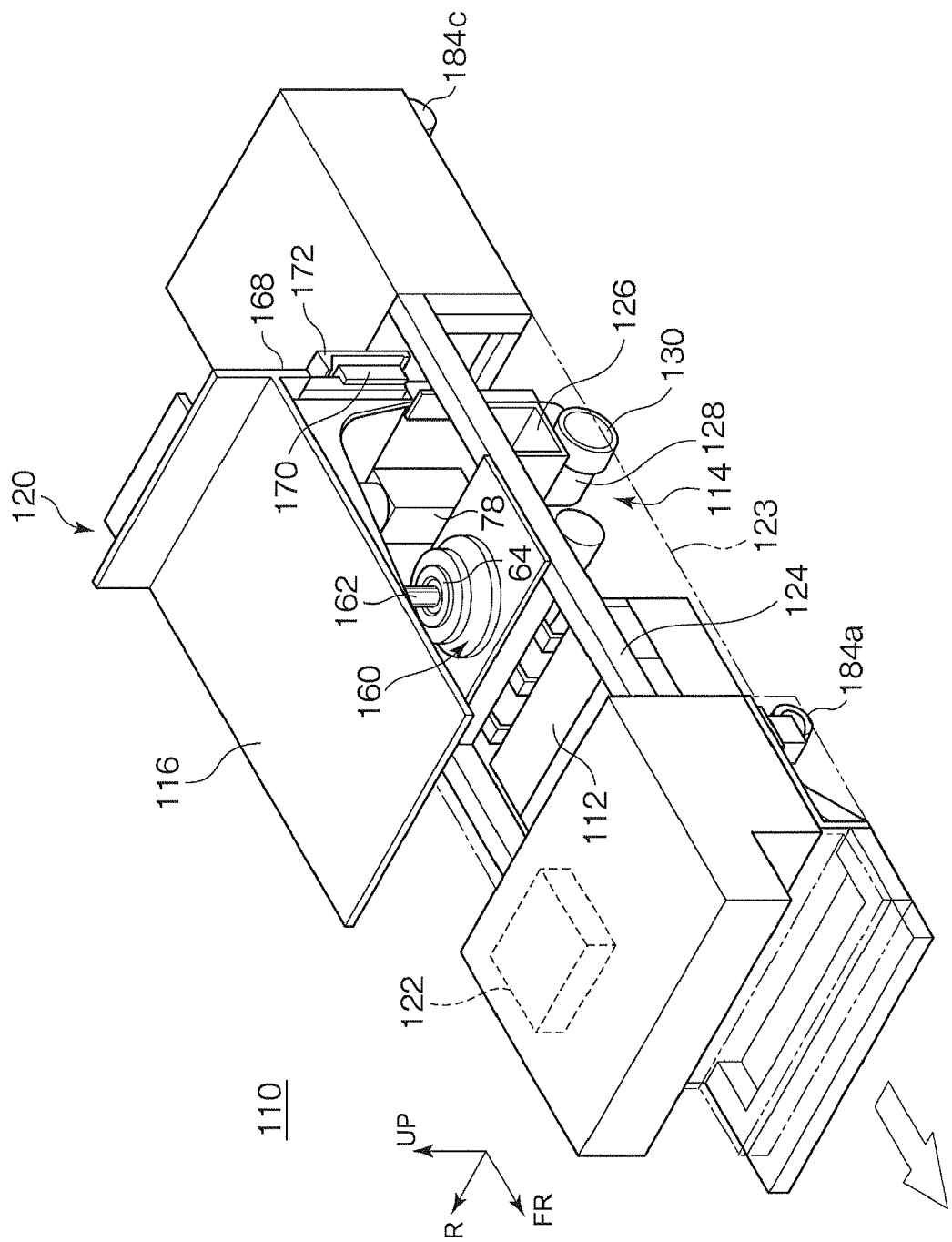
FIG. 8 is a partially-omitted perspective view showing a conveying vehicle as an applied example of a vehicle according to a second embodiment.
Figure 9:
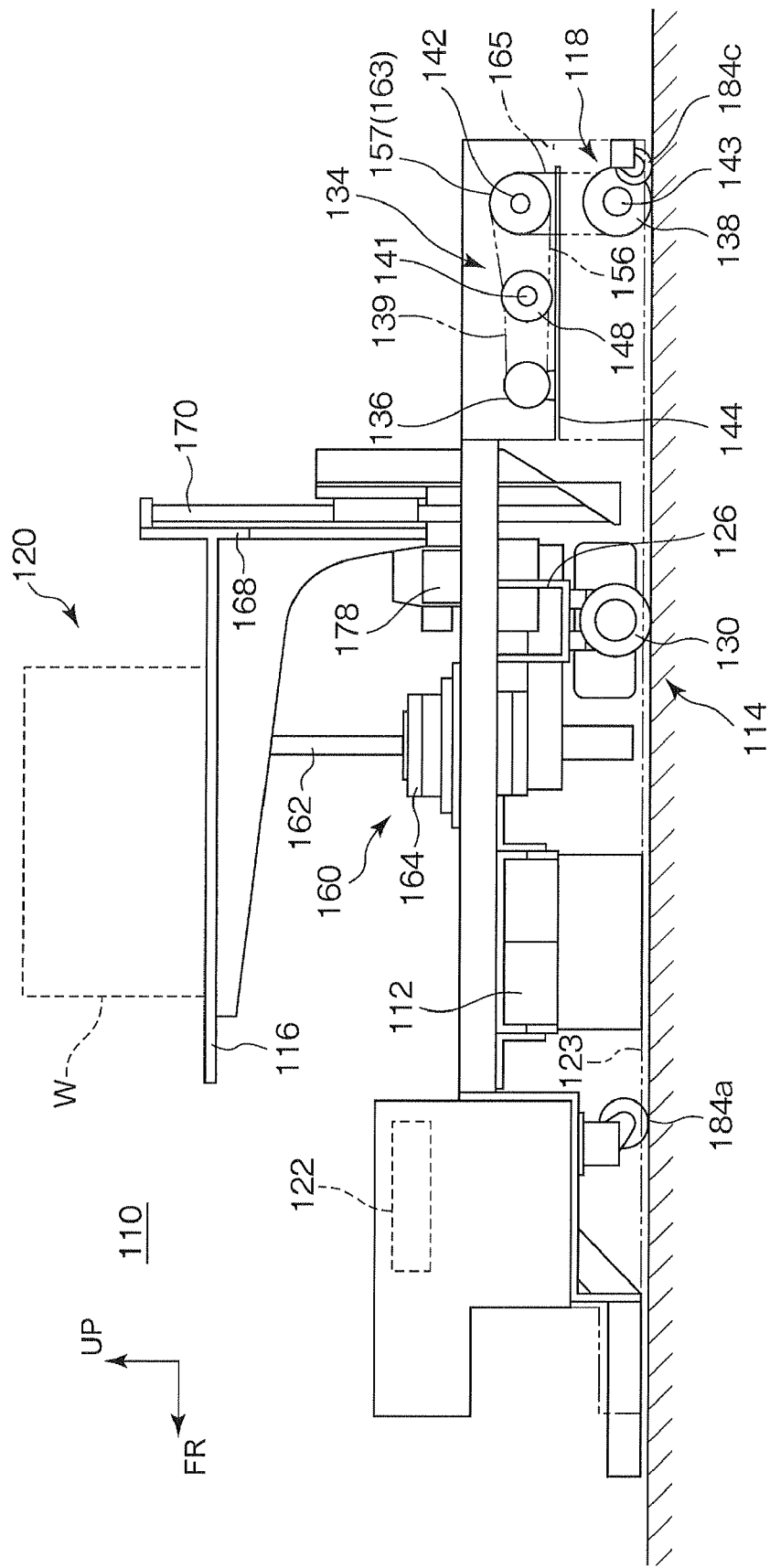
FIG. 9 is a partially-omitted side view of the conveying vehicle shown in FIG. 8.
Figure 10:
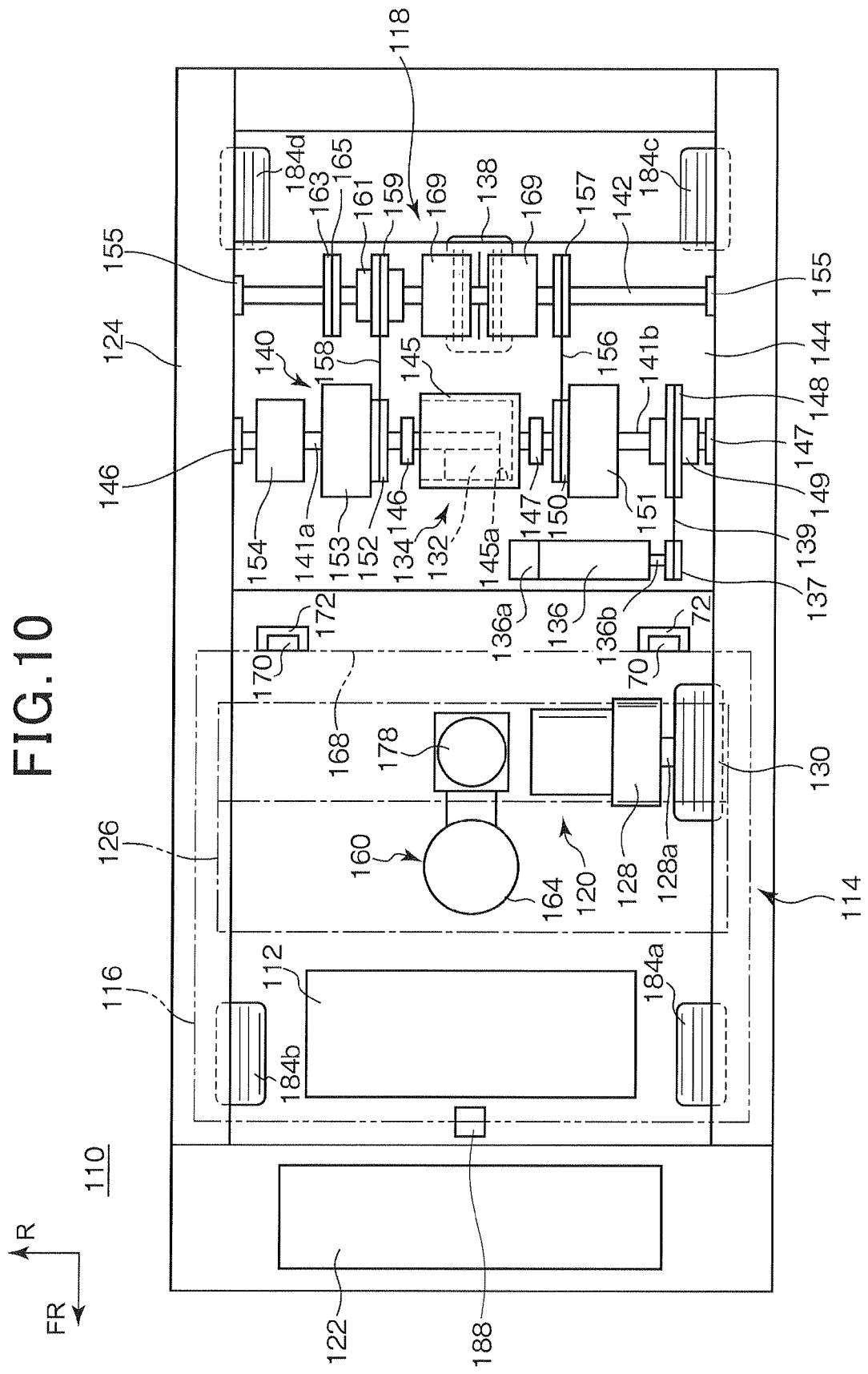
FIG. 10 is a partially-omitted plan view showing a driving system of the conveying vehicle shown in FIG. 8.
Figure 11:
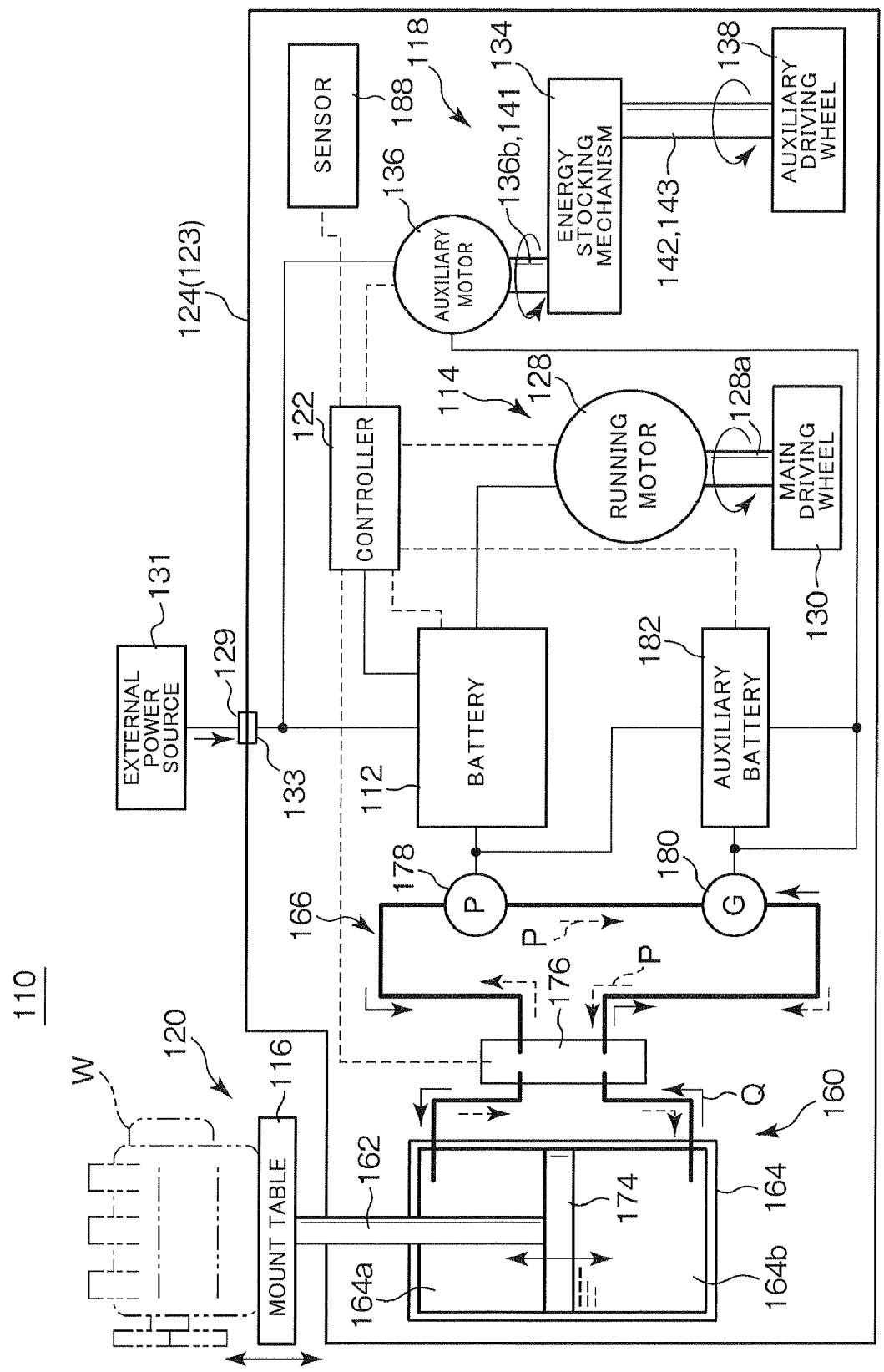
FIG. 11 is a block diagram showing an electrical system and a hydraulic system of the conveying vehicle shown in FIG. 8.

FIG. 8 is a partially-omitted perspective view of a conveying vehicle 110 as an applied example of a vehicle according to a second embodiment, and FIG. 9 is a partially-omitted side view of the conveying vehicle 110 shown in FIG. 8. FIG. 10 is a partially-omitted plan view showing the driving system of the conveying vehicle 110 shown in FIG. 9, and FIG. 11 is a block diagram showing an electrical system and a hydraulic system of the conveying vehicle 110 shown in FIG. 8.

The conveying vehicle 110 is an electrically-operated vehicle which can run on a desired passage with power from a main power unit 114 using a battery (power supply unit) 112 as a power source, and for example, it is an unmanned automated guided vehicle (AGV) having a mount table 116 on which a part (work) such as an engine, a gear box or the like of a vehicle, and conveys the part to a desired position in a factory. In the second embodiment, the conveying vehicle 110 is used as an example of the electrically-operated vehicle, however, any vehicle such as a passenger car, an electrically-operate cart, an electric train or the like may be applied insofar as it can run with electrical power.

The conveying vehicle 110 as described above includes a main driving unit 114 which is driven under normal running, an auxiliary power unit 118 which is driven when the vehicle is started from the stopped state of the conveying vehicle 110 and assists the running (driving) of the vehicle based on the main power unit 114, a loading portion 120 including the mount table 116 on which a work W is mounted, and a controller 122 for comprehensively controlling the operations of the main power unit 114, the auxiliary power unit 118 and the loading portion 120. The respective parts are mounted on a vehicle body frame (vehicle main body) 124 covered by a body 123.

The main power unit 114 has a motor for running (a driving source for running) 128 which is provided substantially at the center portion of the vehicle body frame 124 in the longitudinal direction of the vehicle and supported by a support frame 126 bridged in the vehicle width direction on the vehicle frame 124, a main driving wheel 130 which is rotatably supported through a shaft by the support frame 126 and rotationally driven by the driving shaft 128a of the running motor 128, and a battery 112 for supplying power to the running motor 128.

For example, the battery 112 is charged by an external power source 131 installed in a predetermined station (described later) when the conveying vehicle 110 is stopped at the station to be on standby or perform a work. The conveying vehicle 110 and the external power source 131 are easily electrically connectable to each other through a pair of male and female connectors 129 and 133 which can be detachably fitted to each other by magnetic force, for example (see FIG. 11).

As shown in FIGS. 9 and 10, the auxiliary power unit 118 is provided at the rear portion of the vehicle body frame 124 in the longitudinal direction of the vehicle, and includes an energy stocking mechanism 134 having a spiral spring (elastic member) 132 which can convert power (motive energy) to elastic force and stock the elastic force and also output the stocked elastic force as power, an auxiliary motor (a driving source for stock) 136 for applying power to the energy stocking mechanism 134 to make the spiral spring 132 stock the elastic force, and an auxiliary driving wheel (driving wheel) 138 which are driven with the power based on the elastic force stocked in the energy stocking mechanism 134, and a clutch mechanism 140 for switching output of power from the spiral spring 132 of the energy stocking mechanism 134 to the auxiliary driving wheel 138 and the regeneration of power from the auxiliary driving wheel 138 to the spiral spring 132.

The auxiliary motor 136 is fixed onto a plate bridged in the vehicle width direction of the vehicle body frame 124, and a main shaft (rotational shaft) 141 and an intermediate shaft 142 which are disposed substantially in parallel to the axial line of the auxiliary motor 136 are rotatably supported through shafts on the plate 144. A driving shaft 143 (FIG. 9) of the auxiliary driving wheel 138 is provided at the lower side of the intermediate shaft 142, and the driving shaft 143 is rotatably supported through a shaft by the vehicle body frame 124.

The main shaft 141 is divided into a first shaft (first rotational shaft) 141a and a second shaft (second rotational shaft) 141b, and these first and second shafts 141a and 141b are journaled on the plate 144 by respective bearing portions 146 and 147. A cylindrical casing 145 having a bottom is fixed to the axial end portion of the second shaft 141b, and the shaft end portion of the first shaft 141 extends and the scroll type spiral spring 132 is mounted in the casing 145. One end of the spiral spring 132 is fixed to the inner wall surface 145 of the casing 145, and the other end of the spiral spring 132 is fixed to the outer periphery of the shaft end portion of the first shaft 141a. Accordingly, the spiral spring 132 is wound up around the first shaft 141a on the basis of the rotation of the first shaft 141a and the second shaft 141b. In the second embodiment, the inner wall surface 145a of the casing 145 functions as a parallel portion extending in parallel to the shaft end portion of the first shaft 141a.

The auxiliary motor 136 is a brake-contained motor having a motor brake 136a. A first sprocket 137 is secured to the motor shaft 136b of the auxiliary motor 136, and the first sprocket 137 is joined through a chain 139 to a second sprocket 148 disposed in the second shaft 141b. A first one-way clutch 149 is provided between the second sprocket 148 and the second shaft 141b.

The first one-way clutch 149 is designed as a mechanical clutch. When the second sprocket 148 is rotated in the normal direction (the direction of the rotation based on the auxiliary motor 136), the first one-way clutch 149 is engaged with the second shaft 141b. When the second sprocket 148 is rotated in the reverse rotational direction, the above engagement is released, and the first one-way clutch 149 slips.

A third sprocket 150 disposed between the second sprocket 148 and the casing 145 and an input clutch 151 for performing a switching operation so that the third sprocket 150 and the second shaft 141b can be freely brought into contact with or separated from each other. For example, the input clutch 151 is designed as an electromagnetic type clutch, and when the input clutch 151 is engaged under the control of the controller 122, the third sprocket 150 and the second shaft 141b are engaged with each other, and thus the third sprocket 150 is rotated together with the second shaft 141b. On the other hand, when the engagement of the input clutch 151 is released, the engagement between the third sprocket 150 and the second shaft 141b is released, and the third sprocket 150 slips on the second shaft 141b.

Furthermore, a fourth sprocket 152, an output clutch 153 for performing a switching operation so that the fourth sprocket 152 and the first shaft 141a can be freely brought into contact with or separated from each other, and a spiral spring brake (output limiter) 154 for adjusting the rotational amount of the first shaft 141a are disposed between the pair of the bearing portions 146 on the first shaft 141a. The output clutch 153 is of the same type as the input clutch 151, and in the second embodiment, the clutch mechanism 140 is configured to have the input clutch 151 and the output clutch 153.

The spiral spring brake 154 is an electromagnetic brake, for example, and it permits or prohibits rotation of the first shaft 141a under the control of the controller 122. Furthermore, the spiral spring brake 154 can adjust the rotational amount of the first shaft 141a, and continuously or stepwise outputs elastic force stocked in the spiral spring 132 of the energy stocking mechanism 134 as power in the range from 0% to 100%. Accordingly, the elastic force stocked in the spiral spring 132 is prevented from being output at a burst and also the output amount thereof can be controlled, so that the acceleration or speed of the conveying vehicle 110 can be properly controlled. Furthermore, the driving time of the auxiliary motor 136 is reduced by suppressing the output amount, and the power consumption to drive the auxiliary motor can be reduced, so that energy saving can be implemented.

The intermediate shaft 142 is journaled by a pair of bearing portions 155 at both the ends thereof on the plate 144, and the intermediate shaft 142 is provided with a fifth sprocket 157 connected to the third sprocket 150 through a chain 156 and a sixth sprocket 159 connected to the fourth sprocket 152 through a chain 158, and a second one-way clutch 161 is disposed between the sixth sprocket 159 and the intermediate shaft 142.

As in the case of the one-way clutch 149, the second one-way clutch 161 is a mechanical type clutch which is engaged with the intermediate shaft 142 when the sixth sprocket 159 rotates in the normal rotational direction, and disengages from the intermediate shaft 142 and slips when the sixth sprocket 159 rotates in the reverse rotational direction.

Figure 12:
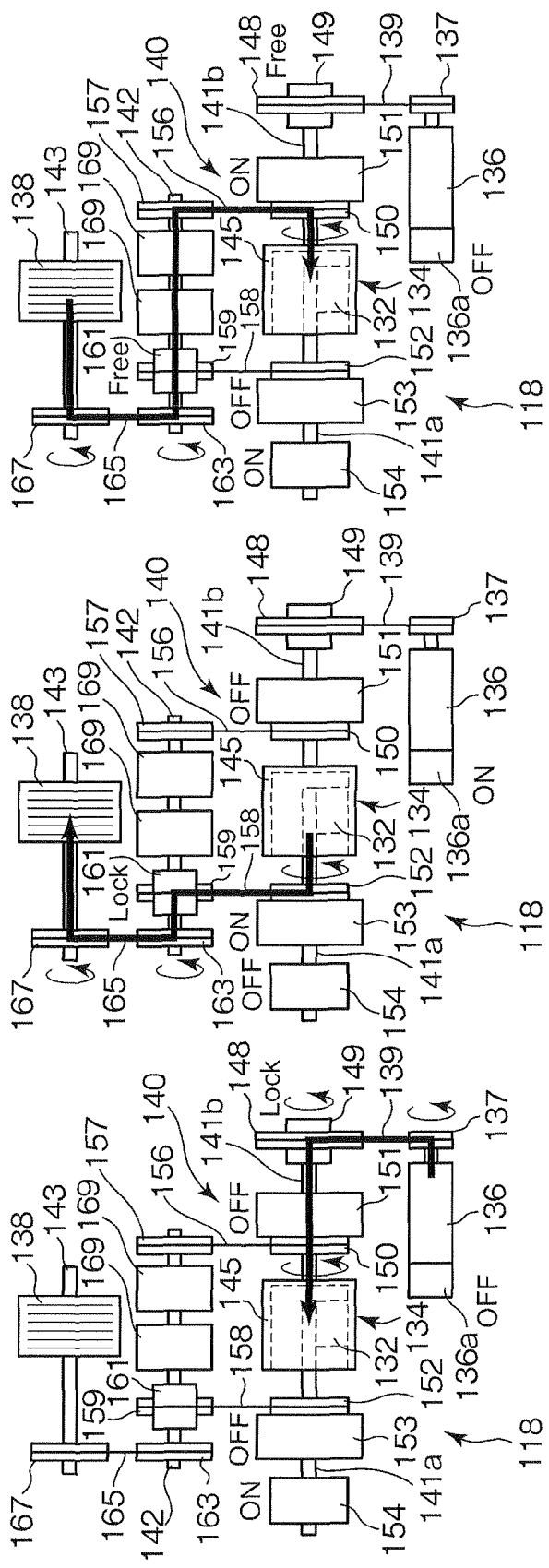
FIG. 12A is a diagram showing an operation when elastic force is stocked in a spiral spring of an energy stock mechanism.
FIG. 12B is a diagram showing an operation when the stocked elastic force is output to an auxiliary driving wheel.
FIG. 12C is a diagram showing an operation when the power (driving force) of the auxiliary driving wheel is regenerated in the spiral spring.

A seventh sprocket 163 is provided between the sixth sprocket 159 and the bearing portion 155, and the seventh sprocket 163 is connected to an eighth sprocket 167 (FIG. 12) provided to the driving shaft 143 through a chain 165. Accordingly, the rotational power of the main shaft 141 is transmitted through the intermediate shaft 142 to the driving shaft 143, and the auxiliary driving wheel 138 is driven.

Furthermore, wheel brakes 169 for regulating the rotation of the intermediate shaft 142 are disposed between the fifth sprocket 157 and the sixth sprocket 159 on the intermediate shaft 142. These wheels brakes 169 are electromagnetic brakes, for example, and under the control of the controller 122, they reduce the rotational speed of the intermediate shaft 142 or stop the rotation of the intermediate shaft 142 to thereby control the speed of the conveying vehicle 110.

As shown in FIGS. 9 and 11, the loading portion 120 has a mount table 116 as a table on which a work W is mounted, and an elevating device 160 which can move the mount table 116 in an up-and-down direction and hold the mount table 116 and the work W at a desired height position.

The elevating device 160 comprises a hydraulic cylinder (elevating mechanism) 164 for elevating the mount table 116 through a rod 162 fixed to the substantially center lower surface of the mount table 116, and a hydraulic circuit 166 (see FIG. 11) for driving the hydraulic cylinder 164. The elevating operation of the mount table 116 is executed while the mount table 116 is guided by rails 170 extending in the up-and-down direction of the vehicle in parallel to the rod 162 at both the sides in the vehicle width direction of a vertical plate 168 provided at the rear portion of the mount table 116, and guide recess portions 172 which are fixed to the vehicle body frame 124 side and slidably fitted to the rails 170.

As shown in FIG. 11, the hydraulic circuit 166 is connected through a control valve mechanism 176 to each of an upper chamber 164a and a lower chamber 164b of a hydraulic cylinder 164 which are compartmented by a piston 174 linked to the rod 162. The control valve mechanism 176 is a valve device for properly switching the intercommunication state with each of the upper chamber 164a and the lower chamber 164b of the hydraulic circuit 166 and also properly switching the flow direction of operating oil, and the operation of the control valve mechanism 176 is controlled by the controller 122.

A pump 178 for pressurizing and fluidizing the operating oil in the circuit and a generator (electric generator) 180 which receives the pressure or flow of the operating oil to generate electric power are disposed in the hydraulic circuit 166. The power generated by the generator 180 is charged in an auxiliary battery 182 comprising an electricity storage element such as a capacitor or the like, a secondary battery or the like, and then used as driving power for the pump 178. When the power of the auxiliary battery 182 is insufficient for the driving power of the pump 178, the battery 112 may be used. Furthermore, it is needless to say that the auxiliary battery 182 is not provided and the power generated in the generator 180 is charged in the battery 112. In this case, the weight of the conveying vehicle 110 is reduced by only the weight of the removed auxiliary battery 182.

The conveying vehicle 110 as described above runs by properly driving the main driving wheel 130 and the auxiliary driving wheels 138 under the control of the controller 122. However, wheels 184a to 184d which are driven and rotated during the running of the vehicle based on the main driving wheel 130 and the auxiliary driving wheel 138 are further supported through shafts by the vehicle body frame 124 (see FIG. 10). The wheels 184a and 184b serving as the front wheels in the forward running direction (the direction of the arrow in FIG. 8) of the conveying vehicle 110 may be made to function as steering wheels steered under the control of the controller 122, for example, or the wheels 184c and 184d serving as the rear wheels may be made to function as steering wheels.

Furthermore, a sensor 188 (see FIG. 10) for detecting the magnetic field of a magnetic tape 186 (see FIG. 13) which is attached onto a passage on which the conveying vehicle 110 runs in a factory and guides the conveying vehicle 110 is provided at the vehicle bottom surface side of the conveying vehicle 110. Accordingly, the conveying vehicle 110 can be magnetically induced. In place of the above method of guiding the conveying vehicle 110, a method of laying down a rail on the floor surface and inducing the conveying vehicle along the rail or other methods may be used.

Next, the running operation of the conveying vehicle 110 according to the second embodiment will be described.

Under the control of the controller 122, the conveying vehicle 110 is basically controlled to run (starts running) by using the auxiliary power unit 118 when it starts running from the stopped state, and also run by using the main power unit 114 when it normally runs after the start of running.

For example, when the conveying vehicle 110 is stopped at a standby station or a working station (described later), the battery 112 of the conveying vehicle 110 is charged by an external power source 31 provided to the standby station or the working station. Here, when the conveying vehicle 110 runs (starts running) by using the auxiliary power unit 118, the controller 122 drives the auxiliary motor 136 with power form the external power source 131.

At this time, the controller 122 sets the spiral spring brake 154 to an operating state (ON), and also sets the input clutch 151 and the output clutch 153 to a separation state (OFF). That is, by operating the spiral spring brake 154, the first shaft 141a is fixed so that it does not rotate, and by separating the input clutch 151, even when the second shaft 141b rotates, this rotation is prevented from being transmitted to the intermediate shaft 142.

When the auxiliary motor 136 is driven, as shown in FIG. 12A, the rotation in the normal rotational direction of the auxiliary motor 136 is transmitted to the second shaft 141b through the first one-way clutch 149, and the second shaft 141b is rotated together with the casing 145, whereby the spiral spring 132 is wound up around the first shaft 141a. Under this state, the elastic force which rotates the second shaft 141b in the reverse rotational direction occurs in the spiral spring 132. Therefore, the controller 122 operates (turns on) the motor brake 136a of the auxiliary motor 136, whereby the motor shaft 136b and the second shaft 141b are fixed so that they do not rotate in the reverse rotational direction. As described above, in the energy stocking mechanism 134, the power (rotational torque) of the auxiliary motor 136 is converted to elastic force of the spiral spring 132 and stocked.

Next, after the charging of the battery 112 by the external power source 131 and the stock of the elastic force in the energy stocking mechanism 134 are completed, a preparation for start of running (start moving) is made. That is, the controller 122 sets the output clutch 153 to a connection state (ON). Accordingly, the fourth sprocket 152 and the first shaft 141a are engaged with each other, and the fourth sprocket 152 can be rotated together with the rotation of the first shaft 141a, so that the power (rotational force) of the first shaft 141a is allowed to be transmitted to the auxiliary driving wheel 138 through the intermediate shaft 142 and the driving shaft 143. In this case, the holding based on the spiral spring brake 154 which sets the first shaft 141a to the rotation-stopped state, and the holding based on the motor brake 136a which sets the second shaft 141b to the rotation-stopped state are continued.

When the spiral spring brake 154 is released, as shown in FIG. 12B, the elastic force of the spiral spring 132 is released, so that the first shaft 141a is roundly rotated. Accordingly, the rotational driving force of the first shaft 141a is transmitted to the driving shaft 143 through the fourth sprocket 152, the chain 158, the sixth sprocket 159, the second one-way clutch 161, the intermediate shaft 142, the seventh sprocket 163, the chain 165 and the eighth sprocket 167, whereby the driving shaft 143 is rotated. Accordingly, the auxiliary driving wheel 138 is rotated so that the conveying vehicle 110 moves forwardly, and thus the conveying vehicle 110 can start running (moving).

With respect to the start of running based on the auxiliary power unit 118 as described above, the first shaft 141a is rotated to apply a rotational torque to the auxiliary driving wheel 138 at least until the elastic force stocked in the spiral spring 132 is released. Furthermore, the second one-way clutch 161 is provided between the intermediate shaft 142 and the sixth sprocket 159. Therefore, even when the elastic force stocked in the spiral spring 132 is released and the rotational speed of the first shaft 141a is lower than the rotational speed of the intermediate shaft 142, the second one-way clutch 161 slips and thus the rotation of the intermediate shaft 142 and the driving shaft 143 is continued, so that the conveying vehicle 110 can run by some degree of distance with the inertial force thereof. Accordingly, the conveying vehicle 110 can run with only the elastic force stocked in the spiral spring 132 of the energy stocking mechanism 134 among working stations in a factory by designing the conveying vehicle 110 in consideration of the vehicle weight of the conveying vehicle 110 containing a work to be conveyed, the characteristic of the spiral spring 132, losses of the respective bearings, etc., for example.

A clutch (not shown) may be disposed between the driving shaft 128a of the running motor 128 and the main driving wheel 130 so that the clutch concerned is set to a separation state when the conveying vehicle 110 starts running by the auxiliary power unit 118. In this case, the load on the running motor 28 which is not used at the running start time can be reduced, and also the load from the running motor 128 can be effectively suppressed from affecting the running starting operation.

When the running of the conveying vehicle 110 is continued after the start of running based on the auxiliary power unit 118, the controller 122 drives the main power unit 114, and drives the running motor 128 with the power from the battery 112, whereby the conveying vehicle can continuously run as a normal electrically-operated vehicle.

Subsequently, when the conveying vehicle 110 runs, the controller 122 executes an operation of regenerating the rotational power of the auxiliary driving wheel 138 to the spiral spring 132 of the energy stocking mechanism 134. In this case, from the viewpoint of energy, it is more desired to execute the regenerating operation during deceleration of the conveying vehicle 110 than during running of the conveying vehicle 110 based on the running motor 128.

When the conveying vehicle 110 shifts to a decelerating operation, the controller 122 sets the spiral spring brake 154 to the operating state (ON), and also sets the input clutch 151 to the connection state (ON), whereby the third sprocket 150 and the second shaft 141b are engaged with each other. Accordingly, the rotational driving force of the auxiliary wheel 138 is transmitted to the second shaft 141b through the driving shaft 143, the eighth sprocket 167, the chain, the seventh sprocket 163, the intermediate shaft 142, the fifth sprocket 157, the chain 156 and the third sprocket 150, and the casing 145 is rotated together with the second shaft 141b, whereby the spiral spring 132 is wound up around the first shaft 141a.

As described above, in this construction, the input clutch 151 is set to the connection state (ON) during the running of the conveying vehicle 110, whereby the rotational driving force of the auxiliary driving wheel 138 can be regenerated (stocked) as the elastic force of the spiral spring 132. Therefore, in the next running operation, the auxiliary motor 136 may be driven at a station to supplement the spiral spring 132 of the energy stocking mechanism 134 with elastic force which is not enough even by the regeneration. Accordingly, the power for stocking the elastic force into the spiral spring 132 can be reduced, and the power consumption for driving the auxiliary motor 136 can be reduced, so that energy saving can be implemented.

In a general vehicle in which elastic force is stocked by winding up a spiral spring around a rotational shaft, the rotational direction of the rotational shaft when elastic force is stocked is opposite to the rotational direction of the rotational shaft when the stocked elastic force is output (released). Therefore, when elastic force is output to a shaft rotating in a fixed direction under normal running (for example, forward running) and elastic force is generated by using the rotational driving force of this shaft as in the case of the driving shaft of the conveying vehicle, it is necessary to provide a mechanism for reversing the rotational shaft of the spiral spring between the output operation and the regenerating operation. Therefore, the construction of the vehicle is complicated.

On the other hand, according to the construction of this embodiment, the energy stocking mechanism 134 has the divided first and second shafts 141a and 141b and the spiral spring 132 disposed between these shafts, and thus the first shaft 141a and the second shaft 141b can be rotated in the same rotational direction in the output operation of outputting the elastic force stocked in the spiral spring 132 to the auxiliary driving wheel 138 and in the regenerating operation of regenerating (stocking) the rotational driving force of the auxiliary driving wheel 138 as the elastic force into the spiral spring 132. Therefore, it is unnecessary to provide a mechanism for reversing the rotation of the rotational shaft between the elastic force stocking (regenerating) operation and the elastic force outputting operation, and thus the construction of the energy stocking mechanism can be simplified.

As described above, according to the conveying vehicle 110 of the second embodiment, the auxiliary driving wheel 138 is driven by the elastic force stocked in the spiral spring 132 of the energy stocking mechanism 134, whereby the conveying vehicle can start running from the stopped state. In this case, the auxiliary motor 136 for winding up the spiral spring 132 is driven by the external power source 131 when the conveying vehicle 110 is stopped. Therefore, it is unnecessary to consume the battery 112, and also the auxiliary motor 136 can be driven simultaneously with charging of the battery 112, so that no time loss occurs. Furthermore, after the conveying vehicle 110 starts running by using the auxiliary power unit 118, the conveying vehicle can electrically run by using the main power unit 114 as in the case of a general electrically-operated vehicle. Therefore, the conveying vehicle can run on a desired passage by a desired distance.

Furthermore, in general, the power amount (current amount) of the motor under low-speed rotation is larger than that under predetermined high-speed rotation, and also the driving torque required to start running from a stopped state is very larger than the driving torque under a stationary running state. In other words, if the conveying vehicle 110 is made to start running by using the running motor 28, the running motor 128 must rotate at a low speed and output a high torque. Therefore, the power consumption thereof would be extremely larger that the power consumption of the auxiliary motor 136 for winding the spiral spring 132.

On the other hand, the start of running of the conveying vehicle 110 can be covered by the elastic force of the spiral spring 132, and thus a low-power and compact motor can be used as the running motor 128. Particularly, with respect to the conveying vehicle 110 which is also required to convey a work as a heavy load, the load associated with the start of running is very large, and the effect thereof is remarkable. Furthermore, in the conveying vehicle 110, it is hardly required to use the battery 112 at the running start time. Therefore, the battery 112 can be designed to be small in capacity and compact in size, and thus weight saving and energy saving for the conveying vehicle 110 can be performed. In addition, since the spiral spring is used as the elastic member constituting the energy stocking mechanism 134, the auxiliary power unit 118 can be constructed simply and in low cost.

In the conveying vehicle 110 of the first embodiment, the conveying vehicle 110 according to this invention can be made to run by selectively driving the main power unit 114 and the auxiliary power unit 118 as described above, whereby the energy saving can be more greatly performed as compared with the normal electrically-operated vehicle. With respect to the elevating device 160 constituting the mount portion 120 on which a work is mounted, it is provided with the generator 180, the auxiliary battery 182, etc., whereby energy saving can be further greatly enhanced.

That is, in the elevating device 160, before the work W is mounted on the mount table 116, under the control of the controller 122, the control valve mechanism 176 is first switched and the pump 178 is driven, and oil pressure is applied in the hydraulic circuit 166 in a direction of a broken-line arrow P in FIG. 11. Accordingly, the lower chamber 164b is pressurized, and the mount table 116 is upwardly moved to a desired height position through the piston 174.

Subsequently, the work W is mounted on the mount table 116. At this time, by preventing leakage of hydraulic pressure from the lower chamber 164b through the control valve mechanism 176 and keeping the pressurized state, the height position of the work W can be kept easily and with saved power without keeping the driving of the pump 178.

When the work W is mounted on the mount table 116 or the work W held at the desired height position is downwardly moved, the control valve mechanism 176 is properly controlled so that the mount table 116 is downwardly moved by the weight of the work W and the mount table 116 without driving the pump 178. That is, the control valve mechanism 176 is controlled to be switched so that the operating oil can flow out from the lower chamber 164b and the flow-out operating oil flows through the hydraulic circuit 166 in the direction of a solid-line arrow Q. Accordingly, the operating oil flows out from the lower chamber 164b which is compressed due to the downward movement of the piston 174 in connection with the downward movement of the work W and the mount table 116, so that a vane wheel (not shown) or the like of the generator 180 is rotated to generate power and the generated power is stocked in the auxiliary battery 182.

In the elevating device 160, the pump 178 is driven with the stocked power from the auxiliary battery 182, and the mount table 116 can be returned to the desired height position. When the power from the auxiliary battery 182 is insufficient to return the mount table 116 to the desired height position, the battery 112 may be used in combination.

As described above, in the elevating device 160, power can be generated in the generator 180 by using the weight of the work W and the weight of the mount table 116, and utilized as a driving source of the pump 178 which is used to move the mount table 116 upwardly again through the auxiliary battery 182. That is, the elevating device 160 has an energy regenerating mechanism for regenerating the potential energy of the work W mounted on the mount table 116 at the desired height position as electrical energy by using the hydraulic circuit 166 and the generator 180, and charging the auxiliary battery 182. Therefore, basically, the energy required to move the mount table 116 upwardly and downwardly can be covered by the elevating device 160 itself.

Accordingly, the conveying vehicle 110 has the elevating device 160 having the energy regenerating mechanism described above, and thus it is unnecessary to use power of the battery 112 or the like as elevating energy of the mount table 116. Therefore, the battery 112 can be designed to be smaller in capacity and more compact in size, and thus the energy saving of the conveying vehicle 110 can be more greatly enhanced.

As shown in FIG. 11, in the conveying vehicle 110, the electrical energy which is regenerated by the elevating device 160 and output from the generator 180 may be used not only to charge the auxiliary battery 182, but also to drive the auxiliary motor 136 of the auxiliary power unit 118. Accordingly, even when it is unnecessary to charge the battery 112 under the stopped state or no external power source 131 is provided to a station or the like at which the conveying vehicle is stopped, the auxiliary motor 136 may be driven with the power from the auxiliary battery 182 without using any power from the battery 112 to stock elastic force in the energy stocking mechanism 134.

In addition, the mount table 116 on which the work W is mounted may be downwardly moved at a desired timing to generate power when the conveying vehicle 110 is stopped, whereby the power from the generator 180 is supplied to the auxiliary motor 136 to stock elastic force in the spiral spring 132 when the conveying vehicle 110 is stopped. That is, at the stop time of the conveying vehicle 110, the loading of the work W onto the mount table 116 and the stock of elastic force into the spiral spring 132 can be simultaneously performed, and after the work W is loaded, the quick start of running by the auxiliary power unit 118 can be performed. Therefore, further energy saving and speed-up of the conveying work can be performed.

Next, the conveying system 200 to which the conveying vehicle 110 according to the second embodiment is applied will be described.

Figure 13:
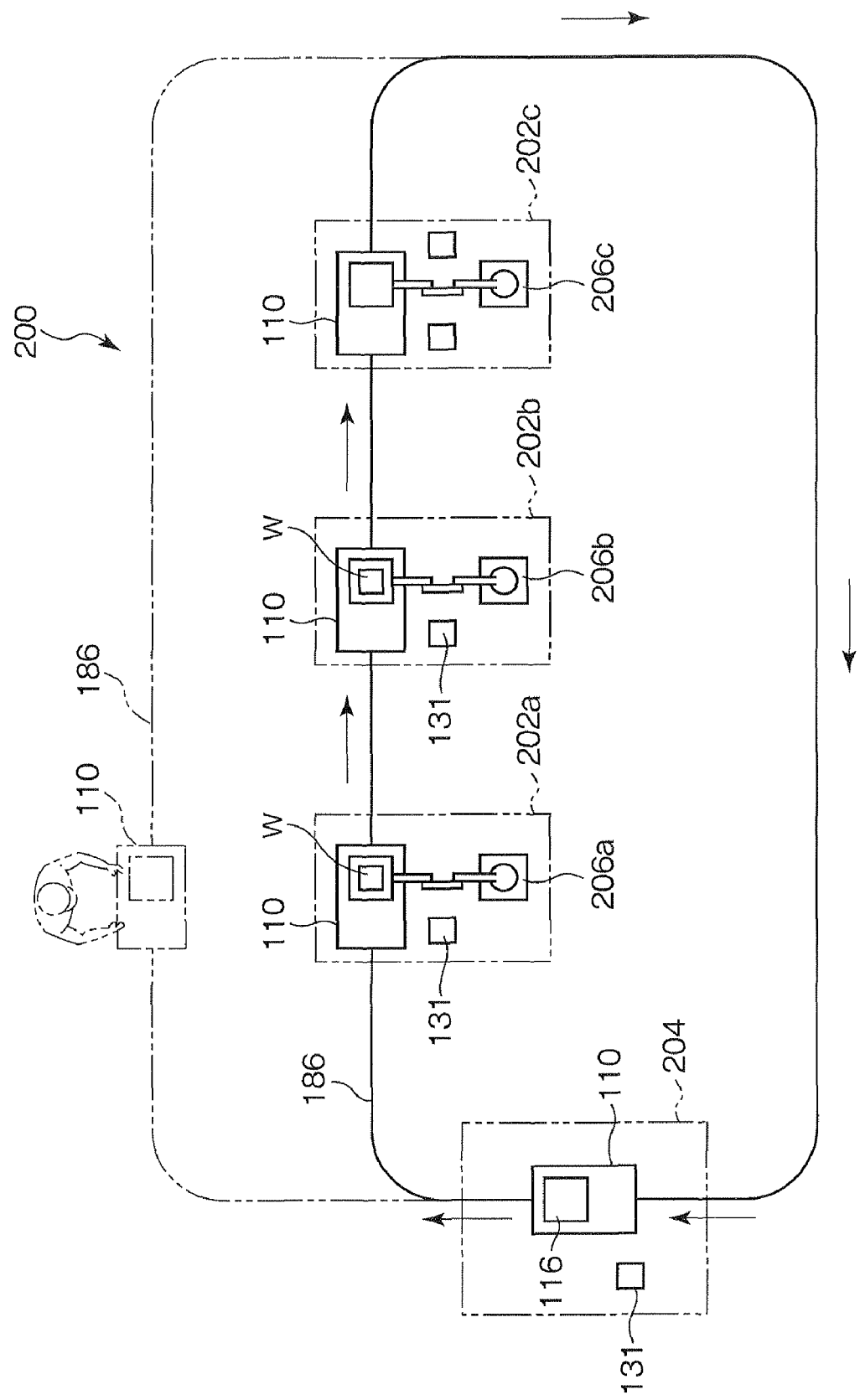
FIG. 13 is a diagram showing a conveying system to which the conveying vehicle shown in FIG. 8 is applied.

As shown in FIG. 13, in the conveying system 200, predetermined works are performed at respective working stations 202a to 202c while plural conveying vehicles 110 run a passage guided by a magnetic tape 186 laid down in a factory.

First, a conveying vehicle 110 which is on standby at a standby station 204 of the conveying system 200 is supplied with power from the external power source 131 to charge the battery 112 and stock elastic force in the energy stocking mechanism 134. After the charging of the battery 112 and the stocking of the elastic force in the energy stocking mechanism 134 are completed, the conveying vehicle 110 concerned starts running by using the auxiliary power unit 118 as a driving source. The conveying vehicle 110 which starts running is guided by a magnetic tape 186 by detecting magnetic field through a sensor 188 under the control of the controller 122, and reaches a first work station 202a.

In this case, in the energy stocking mechanism 134, the rotational driving force of the auxiliary driving wheels 38 are regenerated as elastic force in the spiral spring 132 under the deceleration of the conveying vehicle 110. Therefore, at the work station 202a, the auxiliary motor 136 may be driven to supplement the spiral spring 132 of the energy stocking mechanism with elastic force which is not enough even by the regeneration. Accordingly, the power for stocking the elastic force in the spiral spring 132 can be reduced, and the power consumption for driving the auxiliary motor 136 can be reduced, so that energy saving can be performed.

When the distance between the standby station 204 and the work station 202a is within a sufficiently reachable distance at which the conveying vehicle starting from the standby station 104 reaches the work station 102a by only the power of the auxiliary power unit 118, it is unnecessary to drive the main power unit 114 after the conveying vehicle 110 starts running, and thus the power can be extremely saved. The same is applied to the movement between the following respective work stations.

Subsequently, for example, a work W such as a vehicle engine or the like is loaded onto the mount table 116 of the conveying vehicle 110 reaching the work station 202a by a working robot 106a provided to the work station 202a. Furthermore, in the elevating device 160, energy is regenerated by using the weight of the work W to charge the auxiliary battery 182 as occasion demands.

When power generation is executed in the elevating device 160 substantially simultaneously with the loading of the work W, the auxiliary motor 36 may be driven with the generated power, and elastic force can be stocked in the energy stocking mechanism 134. In some cases, the external power source 131 may be omitted from the work station 202a.

The conveying vehicle 110 on which the work W is loaded starts running by using the auxiliary power unit 118 as the driving source, and reaches the second work station 202b. At the second work station 202b, for example, a desired part (not shown) is assembled with the work W conveyed from the work station 202a by a working robot 206b.

Subsequently, when the conveying vehicle 110 reaches the third work station 202c, for example, a working robot 206c conveys the work W assembled with the desired part from the mount table 116. At the same time, elastic force is stocked in the energy stocking mechanism by the external power source 131 again.

Thereafter, the conveying vehicle 110 starting from the work station 202c runs on a passage along which it returns to the standby station 204 again. At this time, by driving the main power unit 114 after the running start based on the auxiliary power unit 118, the convey vehicle 110 can easily come back to the standby station 204 even when the distance of the return passage to the standby station 204 is relatively long. The conveying vehicle 110 returning to the standby station 204 is supplied with power from the external power source 131 again, and charging of the battery 112 and the stock of elastic force in the energy stocking mechanism 134 are performed. Furthermore, by driving the elevating device 160 with the auxiliary battery 82 charged at the work station 202a, the mount table 116 can be upwardly moved to a desired height position.

As described above, in the conveying system 200, the conveying vehicle 110 can move between the respective work stations or the like with only the power of the auxiliary power unit 118, and thus the work can be performed with extremely saved power. Of course, the main power unit 114 can be driven during the movement between the respective work stations or the like as occasion demands.

In addition, the conveying vehicle 110 can run by using the running motor 128 as in the case of the normal electrically-operated vehicle. Therefore, even when the running passage is relatively long, the conveying vehicle can surely move on the running passage, and the degree of freedom of the design of the moving passage can be enhanced. Therefore, as indicated by a broken line of FIG. 13, the running passage of the conveying vehicle 110 can be easily changed by re-attaching the magnetic tape 86 and slightly changing the control program of the controller 122.

As described above, according to the second embodiment, the conveying vehicle is provided with the energy stocking mechanism 134 having the spiral spring 132 which is connected to the auxiliary driving wheel 138 of the vehicle body frame 124 so that the power (driving force) of the auxiliary driving wheel 138 is converted to elastic force and the thus-converted elastic force is stocked, and also can output the stocked elastic force to the auxiliary driving wheels as power (driving force), the auxiliary motor 136 for stocking power into the spiral spring 132 of the energy stocking mechanism 134, and the clutch mechanism 140 for performing the switching operation between the output of the power from the spiral spring 132 of the energy stocking mechanism 134 to the auxiliary driving wheel 138 of the vehicle body frame 124 and the regeneration of power from the auxiliary driving wheel 138 to the spiral spring. Furthermore, when the conveying vehicle moves by a prescribed distance, the vehicle conveying runs with the power stocked in the energy stocking mechanism 134, and the clutch mechanism 140 is switched to the regeneration side during running, whereby it is possible to generate the power from the auxiliary driving wheel 138 to the spiral spring while the conveying vehicle runs. Therefore, by switching the clutch mechanism 140, the power of the auxiliary driving wheel 138 under running can be regenerated (stocked) as elastic force into the spiral spring 132 of the energy stocking mechanism 134. Accordingly, when the conveying vehicle runs next, the auxiliary motor 136 may be driven to supplement the spiral spring 132 of the energy stocking mechanism 134 with elastic force to be added to insufficient elastic force stocked by only the regeneration. Accordingly, the power for stocking the elastic force in the spiral spring 132 can be reduced, and the power consumption for driving the auxiliary motor 136 can be reduced, whereby energy saving can be performed.

Furthermore, according to the second embodiment, the energy stocking mechanism 134 has the main shaft 141 for winding up the spiral spring 132, the main shaft 141 is divided into the first shaft 141a and the second shaft 141b, one end of the spiral spring 132 is connected to the outer periphery of the shaft end portion of the first shaft 141a, and the other end of the spiral spring 132 is connected to the inner wall surface 145a of the cylindrical casing 145 fixed to the shaft end of the second shaft 141b. Therefore, the first shaft 141a and the second shaft 141b can be rotated in the same rotational direction between the output operation in which the second shaft 141b is fixed and the first shaft 141a is rotated to output the elastic force stocked in the spiral spring 132 to the auxiliary driving wheel 138 and the stocking operation in which the first shaft 141a is fixed and the second shaft 141b is rotated to regenerate (stock) the rotational driving force of the auxiliary motor 136 and the auxiliary driving wheel 138 as elastic force into the spiral spring 132. Therefore, it is unnecessary to provide a mechanism of reversing the rotation of the rotational shaft and connecting the rotational shaft to the driving wheels in the stocking (regenerating) operation of elastic force and the output operating of the stocked elastic force, and thus the construction of the energy stocking mechanism can be simplified.

Furthermore, according to the second embodiment, the clutch mechanism 140 has the output clutch 153 disposed on the first shaft 141a to connect the auxiliary driving wheel 138 to the spiral spring 132 in the output operation of outputting the stocked elastic force and also separate the auxiliary driving wheel 138 from the spiral spring 132 in the stocking operation of power into the spiral spring 132 and in the regenerating operation, and the input clutch 151 disposed on the second shaft 141b to separate the auxiliary driving wheel 138 from the spiral spring 132 in the output operation of the stocked elastic force and connect the auxiliary driving wheel 138 to the spiral spring 132 in the regenerating operation of power into the spiral spring 132. Therefore, on the basis of the connection/separation of the input clutch 151 and the output clutch 153, the rotation/fixing of the first shaft 141a and the second shaft 141b can be simply controlled. Therefore, the stock of elastic force into the spiral spring 132 of the energy stocking mechanism 134 and the output of elastic force in the spiral spring 132 can be smoothly controlled.

Furthermore, according to the second embodiment, the first shaft 141a is provided with the spiral brake 154 which continuously or stepwise outputs the stocked elastic force as power in the range from 0% to 100%. Therefore, the elastic force stocked in the spiral spring 132 can be prevented from being output at a burst and the output amount can be controlled, so that the acceleration and the speed of the conveying vehicle 110 can be properly controlled. Furthermore, the driving time of the auxiliary motor 136 is reduced by suppressing the output amount, and thus the power consumption for driving the auxiliary motor 136 can be reduced.

According to the second embodiment, the main driving wheel 130 for driving the vehicle body frame 124 and the running motor 128 for driving the main driving wheel 130 are provided, and the power stocked in the spiral spring of the energy stocking mechanism 134 assists the driving force of the running motor 128 when the vehicle starts running. Therefore, a low-power and compact motor may be used as the running motor 128, and weight saving and energy saving of the conveying vehicle 110 can be performed.

Furthermore, by switching the clutch mechanism 140 to the regeneration side when the vehicle is located at a position near to the end point of the distance between the respective work stations, the regeneration of power from the auxiliary driving wheel 138 to the spiral spring 132 is enabled while the conveying vehicle runs. Therefore, at a work station at which the conveying vehicle is stopped, the auxiliary motor 136 may be driven to supplement the spiral spring 132 of the energy stocking mechanism 134 with elastic force to be added to insufficient elastic force stocked by only the regeneration. Accordingly, the power for stocking the elastic force in the spiral spring 132 can be reduced, and the power consumption for driving the auxiliary motor 136 can be reduced, whereby energy saving can be performed.

Third Embodiment

Figure 14:
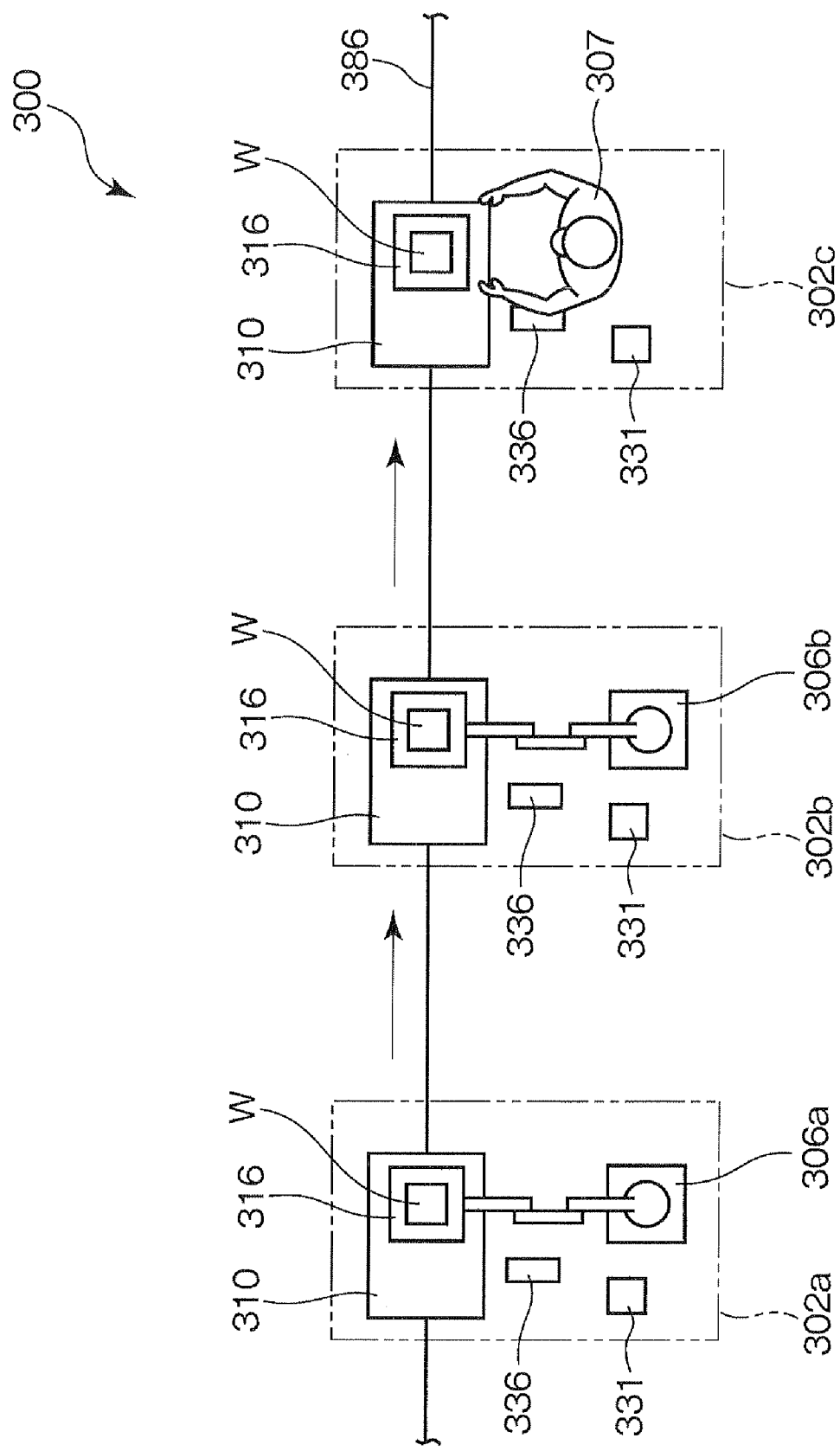
FIG. 14 is a plan view showing a conveying system according to a third embodiment.

FIG. 14 is a partially-omitted plan view showing a conveying system (vehicle system) 300 according to a third embodiment. The conveying system 300 is introduced to a production field of a vehicle factory or the like, for example, and it is configured to contain work stations 302a to 302c provided in a factory, and plural conveying vehicles 310 that load works W such as an engine, a gear box, etc. of a vehicle onto a mount table 316 and convey the works W to the respective work stations 302a to 302c.

The respective work stations 302a to 302c are connected to one another through a magnetic tap 386 laid down in the factory, and the conveying vehicles 310 run on a passage guided by the magnetic tape 386. Working robots 306a and 306b and a worker 307 are disposed, and execute a work of assembling desired parts (not shown) of the works W conveyed by the conveying vehicles 310. Furthermore, each of the work stations 302a to 302c is provided with an external power source 331 for charging a battery (described later) of each conveying vehicle 310 when the conveying vehicle 310 is stopped at each of the work stations 302a to 302c, and a wind-up motor (stocking power source) 336 for winding up the spiral spring (described later) of the energy stocking mechanism of the conveying vehicle 310 and stocking power.

Figure 15:
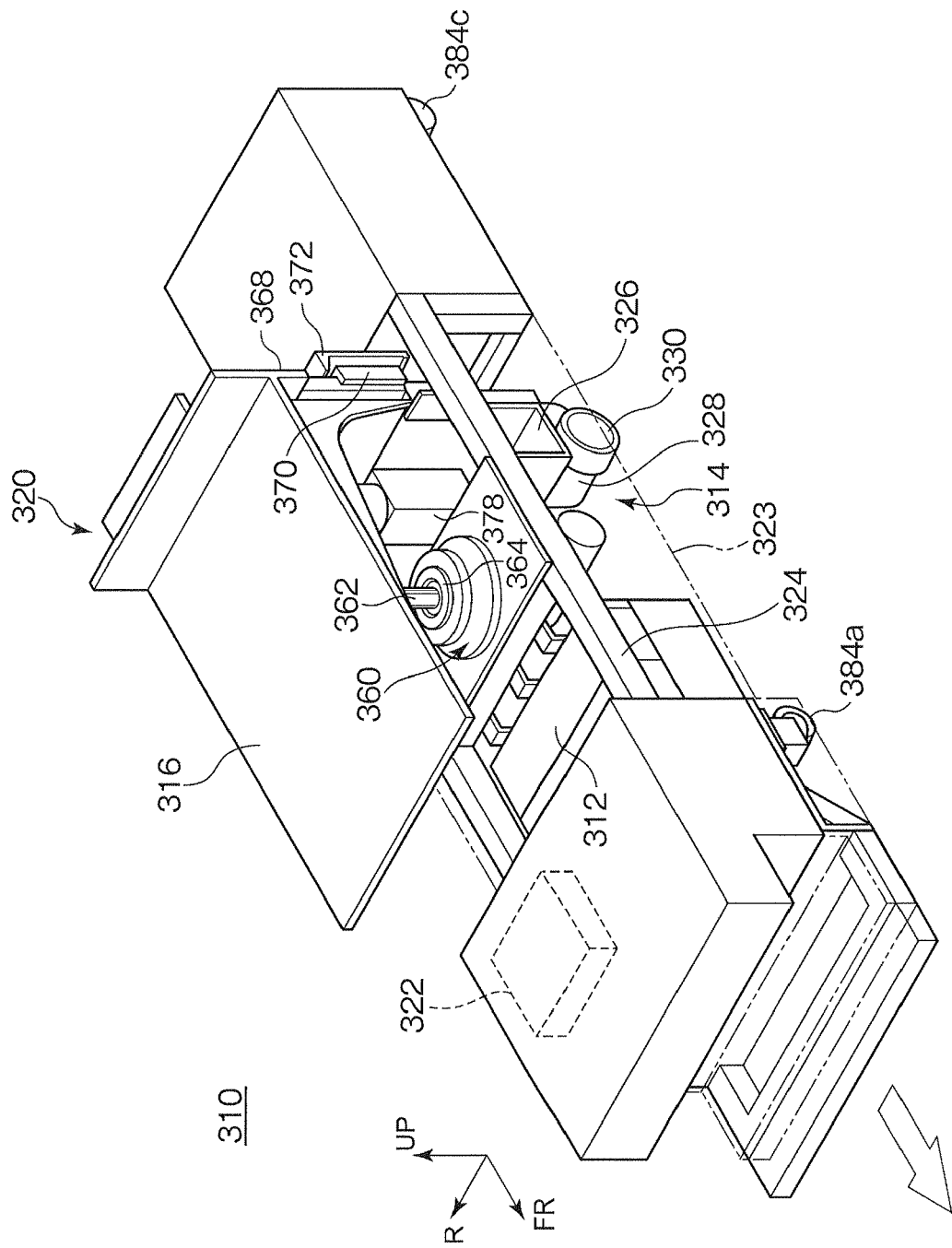
FIG. 15 is a partially-omitted perspective view showing a conveying vehicle used in the conveying system shown in FIG. 14.
Figure 16:
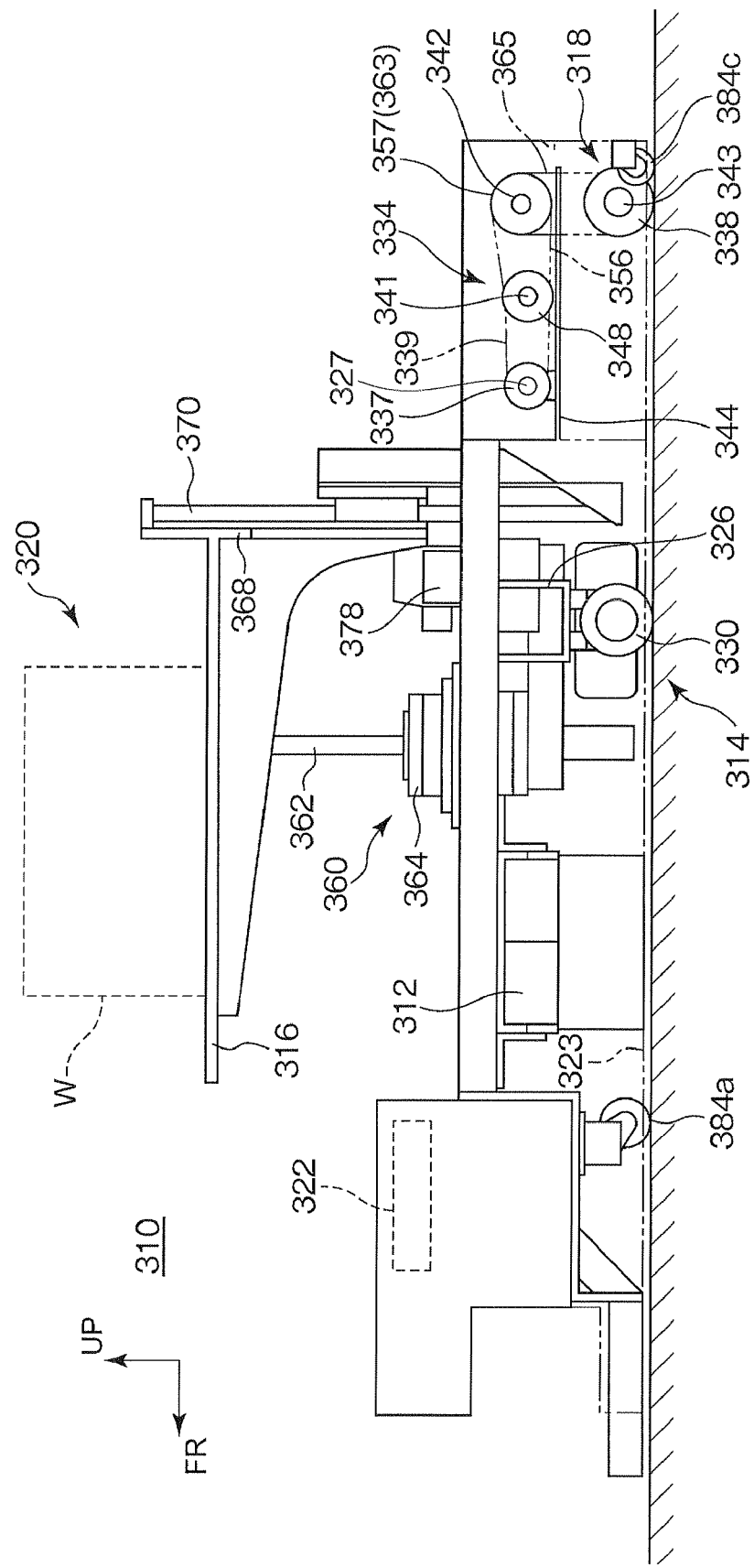
FIG. 16 is a partially-omitted side view of the conveying vehicle shown in FIG. 15.
Figure 17:
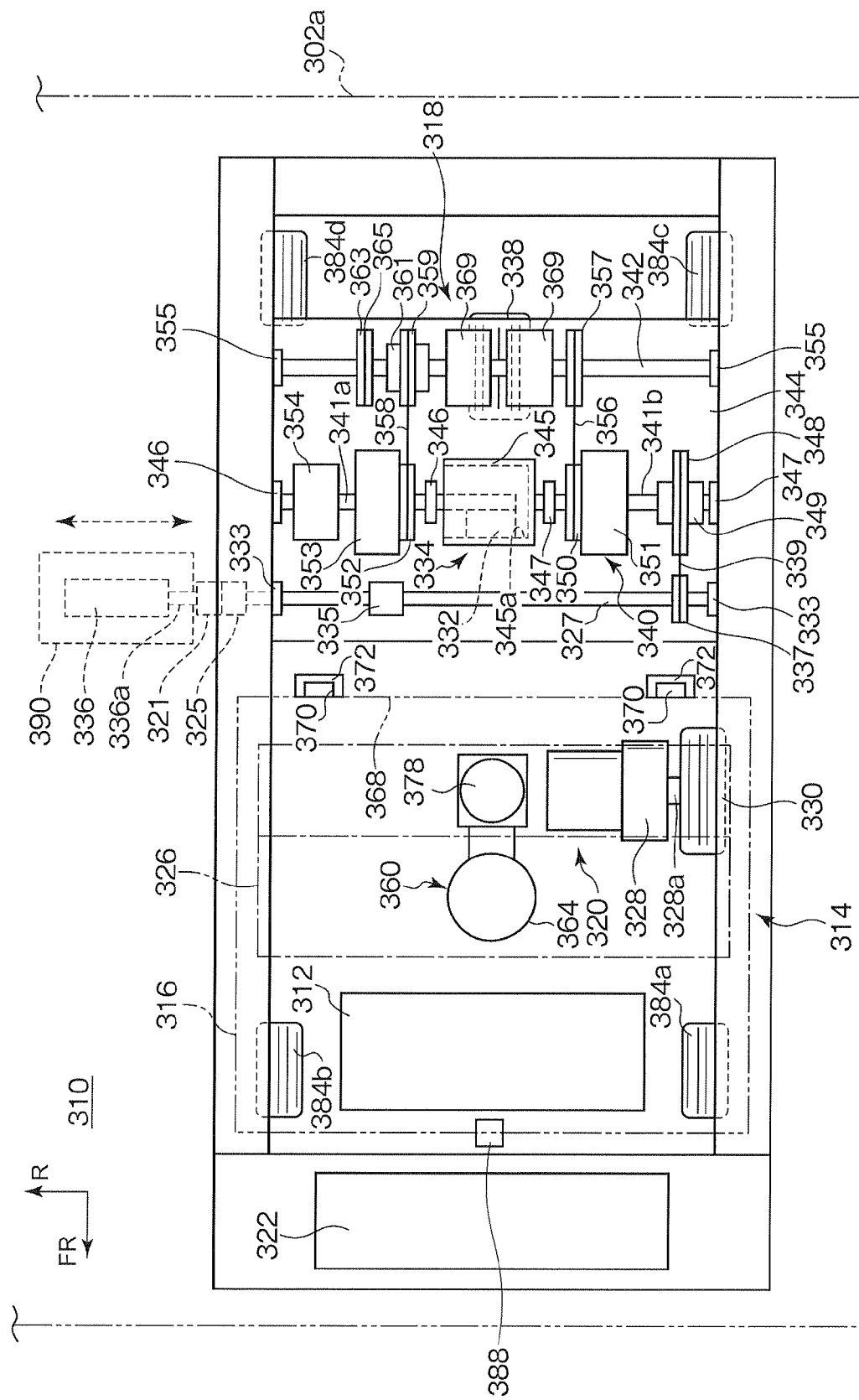
FIG. 17 is a partially-omitted plan view showing a driving system of the conveying vehicle shown in FIG. 15.
Figure 18:
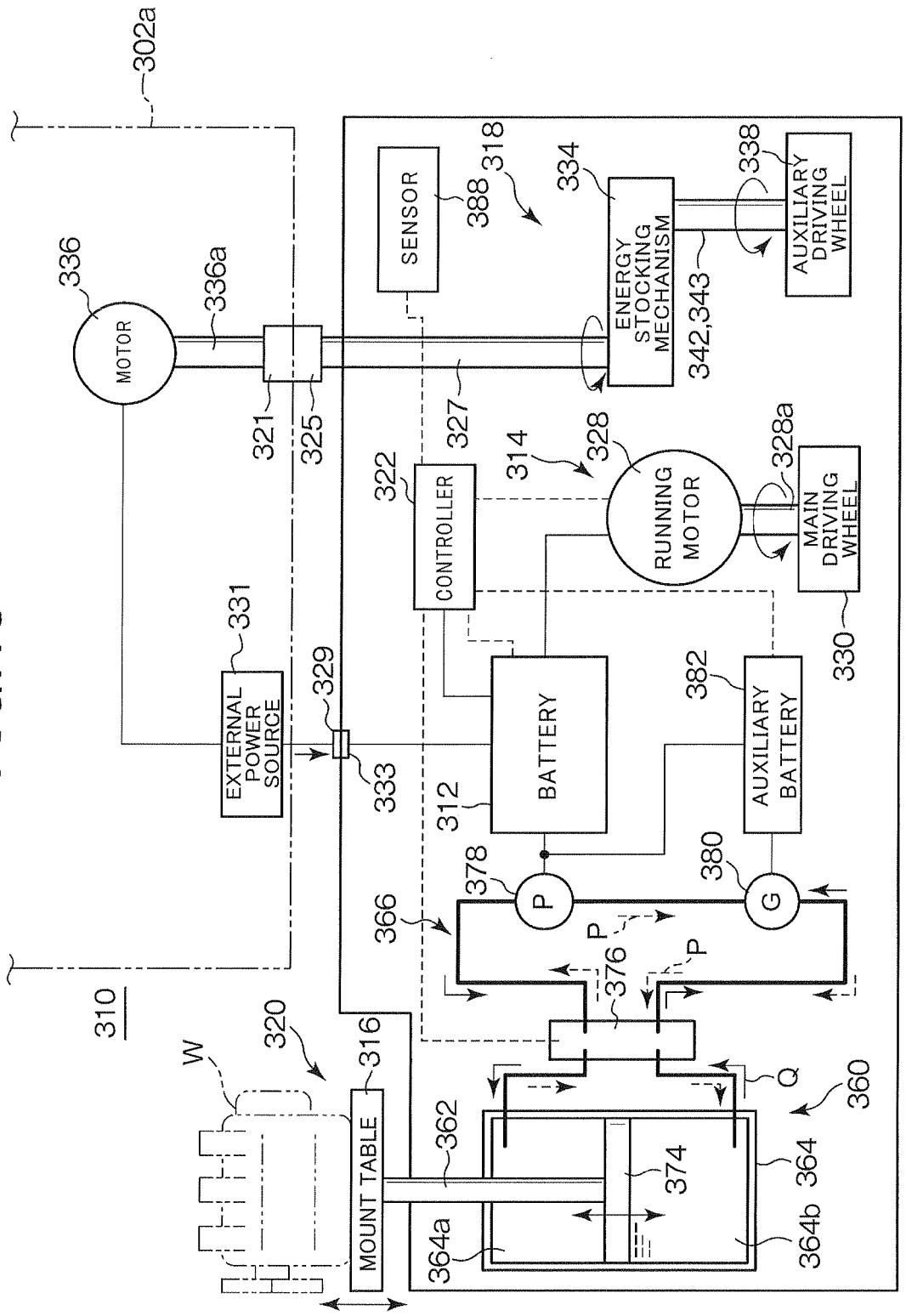
FIG. 18 is a block diagram showing an electrical system and a hydraulic system of the conveying vehicle shown in FIG. 15.

Next, the conveying vehicle 310 will be described. FIG. 15 is a partially-omitted perspective view of a conveying vehicle 310 as an applied example of a vehicle according to a third embodiment, and FIG. 16 is a partially-omitted side view of the conveying vehicle 310 shown in FIG. 15. FIG. 17 is a partially-omitted plan view showing the driving system of the conveying vehicle 310 shown in FIG. 15, and FIG. 18 is a block diagram showing an electrical system and a hydraulic system of the conveying vehicle 10 shown in FIG. 15.

The conveying vehicle 310 is an electrically-operated vehicle which can run on a desired passage with power from a main power unit 314 using a battery (power supply unit) 312 as a power source, and for example, it is an unmanned automated guided vehicle (AGV) having a mount table 316 on which a work W such as an engine, a gear box or the like of a vehicle, and conveys the part to a desired position in a factory. In the third embodiment, the conveying vehicle 310 is used as an example of the electrically-operated vehicle, however, any vehicle such as a passenger car, an electrically-operate cart, an electric train or the like may be applied insofar as it can run with electrical power.

The conveying vehicle 310 as described above includes a main driving unit 314 which is driven under normal running, an auxiliary power unit 318 which is driven when the vehicle is started from the stopped state of the conveying vehicle 310 and assists the running (driving) of the vehicle based on the main power unit 314, a loading portion 320 including the mount table 316 on which a work W is mounted, and a controller 322 for comprehensively controlling the operations of the main power unit 314, the auxiliary power unit 318 and the loading portion 320. The respective parts are mounted on a vehicle body frame (vehicle main body) 324 covered by a body 323.

The main power unit 314 has a motor for running (a driving source for running) 328 which is provided substantially at the center portion of the vehicle body frame 324 in the longitudinal direction of the vehicle and supported by a support frame 326 bridged in the vehicle width direction on the vehicle frame 324, a main driving wheel 330 which is rotatably supported through a shaft by the support frame 326 and rotationally driven by the driving shaft 328a of the running motor 328, and a battery 312 for supplying power to the running motor 328.

For example, the battery 312 is charged by an external power source 131 installed in a predetermined station when the conveying vehicle 310 is stopped at the station to be on standby or perform a work. The conveying vehicle 310 and the external power source 331 are easily electrically connectable to each other through a pair of male and female connectors 329 and 333 which can be detachably fitted to each other by magnetic force, for example (see FIG. 18).

As shown in FIGS. 16 and 17, the auxiliary power unit 318 is provided at the rear portion of the vehicle body frame 324 in the longitudinal direction of the vehicle, and includes an energy stocking mechanism 334 having a spiral spring (elastic member) 332 which can convert power (motive energy) to elastic force and stock the elastic force and also output the stocked elastic force as power, an auxiliary driving wheel (driving wheel) 338 which is driven with the power based on the elastic force stocked in the energy stocking mechanism 334, and a clutch mechanism 340 for switching output of power from the spiral spring 332 of the energy stocking mechanism 334 to the auxiliary driving wheel 338 and the regeneration of power from the auxiliary driving wheels 338 to the spiral spring 332.

A plate 344 is bridged in the vehicle width direction of the vehicle body frame 324, and the input shaft 327, the main shaft (rotational shaft) 341 and the intermediate shaft 342 are pivotally supported on the plate 344 so as to be rotatable and substantially in parallel to one another. A driving shaft 343 (FIG. 16) of the auxiliary driving wheel 338 is provided below the intermediate shaft 342, and the driving shaft 343 is rotatably journaled on the vehicle body frame 324.

The input shaft 327 is journaled on the plate 344 by a pair of bearing portions 333. The shaft end portion of one shaft end portion of the input shaft 327 (at the right side of the vehicle body in the third embodiment) is provided with a coupling unit 325 which is connected to a wind-up motor 336 installed in a station when the conveying vehicle 310 is stopped at the station concerned. This coupling unit 325 is located inside the vehicle body frame 324 so that it does not project outwardly from the vehicle body 324, and it is engaged with a motor-side coupling unit 321 fixed to the motor shaft 336a of the wind-up motor 336 through an opening (not shown) formed in the body 323.

As described above, according to the third embodiment, each work station 302a is provided with the wind-up motor 336 which is connected to the energy stocking mechanism 334 of the conveying vehicle 310 and stocking power in the spiral spring 332 of the energy stocking mechanism 334. Therefore, it is unnecessary to provide the conveying vehicle 301 with the wind-up motor 336 for winding the spiral spring 332, and thus weight saving and compactness of the conveying vehicle 310 can be implemented. Furthermore, only rotational driving force may be supplied from the wind-up motor 336 of each of the work stations 302a to 302c through the input shaft 327 to the energy stocking mechanism 334 of the conveying vehicle 310, and the elastic force can be more easily stocked in the spiral spring 332 even in a water-wetted workshop as compared with the case where the auxiliary motor is installed in the conveying vehicle and electric power is directly supplied from the external source to the auxiliary motor provided to the conveying vehicle.

In the third embodiment, for example, the wind-up motor 336 installed in the work station 302a is mounted on a carriage 390 whose height is set to be substantially identical to the height of the motor shaft 335a and the input shaft 327, and by moving the carriage 390 in the vehicle-width direction of the conveying vehicle 310, the motor-side coupling unit 321 of the wind-up motor 336 is engaged with or separated from the coupling unit 325 of the input shaft 327. Furthermore, the input shaft 327 is provided with a brake 335 and a first sprocket 337. The brake 335 comprises an electromagnetic brake, for example, and it permits or prohibit rotation of the input shaft 327 under the control of the controller 322.

The main shaft 341 is divided into a first shaft (first rotational shaft) 341a and a second shaft (second rotational shaft) 141b, and these first and second shafts 341a and 341b are journaled on the plate 344 by respective bearing portions 346 and 347. A cylindrical casing 345 having a bottom is fixed to the axial end portion of the second shaft 341b, and the shaft end portion of the first shaft 341 extends and the scroll type spiral spring 332 is mounted in the casing 345. One end of the spiral spring 332 is fixed to the inner wall surface 345 of the casing 345, and the other end of the spiral spring 332 is fixed to the outer periphery of the shaft end portion of the first shaft 341a. Accordingly, the spiral spring 332 is wound up around the first shaft 341a on the basis of the rotation of the first shaft 341a and the second shaft 341b. In the third embodiment, the inner wall surface 345a of the casing 345 functions as a parallel portion extending in parallel to the shaft end portion of the first shaft 341a.

A second sprocket 348 which is connected through the first sprocket 337 and the chain 339 is provided to the shaft end portion at the opposite side to the casing 345 of the second shaft 341b, and a first one-way clutch 349 is provided between the second sprocket 348 and the second shaft 341b.

The first one-way clutch 349 is designed as a mechanical clutch. When the second sprocket 348 is rotated in the normal direction (the direction of the rotation based on the wind-up motor 336), the first one-way clutch 349 is engaged with the second shaft 341b. When the second sprocket 348 is rotated in the reverse rotational direction, the above engagement is released, and the first one-way clutch 349 slips.

A third sprocket 350 disposed between the second sprocket 348 and the casing 345 and an input clutch 351 for performing a switching operation so that the third sprocket 350 and the second shaft 341b can be freely brought into contact with or separated from each other. For example, the input clutch 351 is designed as an electromagnetic type clutch, and when the input clutch 351 is engaged under the control of the controller 322, the third sprocket 350 and the second shaft 341b are engaged with each other, and thus the third sprocket 350 is rotated together with the second shaft 341b. On the other hand, when the engagement of the input clutch 351 is released, the engagement between the third sprocket 350 and the second shaft 341b is released, and the third sprocket 350 slips on the second shaft 341b.

Furthermore, a fourth sprocket 352, an output clutch 353 for performing a switching operation so that the fourth sprocket 352 and the first shaft 341a can be freely brought into contact with or separated from each other, and a spiral spring brake (output limiter) 354 for adjusting the rotational amount of the first shaft 341a are disposed between the pair of the bearing portions 346 on the first shaft 341a. The output clutch 353 is of the same type as the input clutch 351, and in the second embodiment, the clutch mechanism 340 is configured to have the input clutch 351 and the output clutch 353.

The spiral spring brake 354 is an electromagnetic brake, for example, and it permits or prohibits rotation of the first shaft 341a under the control of the controller 322. Furthermore, the spiral spring brake 354 can adjust the rotational amount of the first shaft 341a, and continuously or stepwise outputs elastic force stocked in the spiral spring 332 of the energy stocking mechanism 334 as power in the range from 0% to 100%. Accordingly, the elastic force stocked in the spiral spring 332 is prevented from being output at a burst and also the output amount thereof can be controlled, so that the acceleration or speed of the conveying vehicle 310 can be properly controlled. Furthermore, the driving time of the wind-up motor 336 is reduced by suppressing the output amount, and the power consumption to drive the auxiliary motor can be reduced, so that energy saving can be implemented.

The intermediate shaft 342 is journaled by a pair of bearing portions 355 at both the ends thereof on the plate 344, and the intermediate shaft 342 is provided with a fifth sprocket 357 connected to the third sprocket 130 through a chain 356 and a sixth sprocket 359 connected to the fourth sprocket 352 through a chain 358, and a second one-way clutch 361 is disposed between the sixth sprocket 359 and the intermediate shaft 342.

As in the case of the one-way clutch 349, the second one-way clutch 361 is a mechanical type clutch which is engaged with the intermediate shaft 342 when the sixth sprocket 359 rotates in the normal rotational direction, and disengages from the intermediate shaft 132 and slips when the sixth sprocket 359 rotates in the reverse rotational direction.

A seventh sprocket 363 is provided between the sixth sprocket 359 and the bearing portion 355, and the seventh sprocket 363 is connected to an eighth sprocket 367 (FIG. 19) provided to the driving shaft 343 through a chain 365. Accordingly, the rotational power of the main shaft 341 is transmitted through the intermediate shaft 342 to the driving shaft 343, and the auxiliary driving wheel 338 is driven.

Furthermore, wheel brakes 369 for regulating the rotation of the intermediate shaft 342 are disposed between the fifth sprocket 357 and the sixth sprocket 359 on the intermediate shaft 342. These wheels brakes 369 are electromagnetic brakes, for example, and under the control of the controller 322, they reduce the rotational speed of the intermediate shaft 342 or stop the rotation of the intermediate shaft 342 to thereby control the speed of the conveying vehicle 310.

As shown in FIGS. 16 and 18, the loading portion 120 has a mount table 316 as a table on which a work W is mounted, and an elevating device 360 which can move the mount table 316 in an up-and-down direction and hold the mount table 316 and the work W at a desired height position.

The elevating device 360 comprises a hydraulic cylinder (elevating mechanism) 364 for elevating the mount table 316 through a rod 362 fixed to the substantially center lower surface of the mount table 316, and a hydraulic circuit 366 (see FIG. 18) for driving the hydraulic cylinder 364. The elevating operation of the mount table 316 is executed while the mount table 316 is guided by rails 370 extending in the up-and-down direction of the vehicle in parallel to the rod 362 at both the sides in the vehicle width direction of a vertical plate 368 provided at the rear portion of the mount table 316, and guide recess portions 372 which are fixed to the vehicle body frame 324 side and slidably fitted to the rails 370.

As shown in FIG. 18, the hydraulic circuit 366 is connected through a control valve mechanism 376 to each of an upper chamber 364a and a lower chamber 364b of a hydraulic cylinder 364 which are compartmented by a piston 374 linked to the rod 362. The control valve mechanism 376 is a valve device for properly switching the intercommunication state with each of the upper chamber 364a and the lower chamber 364b of the hydraulic circuit 366 and also properly switching the flow direction of operating oil, and the operation of the control valve mechanism 376 is controlled by the controller 322.

A pump 378 for pressurizing and fluidizing the operating oil in the circuit and a generator (electric generator) 380 which receives the pressure or flow of the operating oil to generate electric power are disposed in the hydraulic circuit 366. The power generated by the generator 380 is charged in an auxiliary battery 382 comprising an electricity storage element such as a capacitor or the like, a secondary battery or the like, and then used as driving power for the pump 378. When the power of the auxiliary battery 382 is insufficient for the driving power of the pump 378, the battery 312 may be used. Furthermore, it is needless to say that the auxiliary battery 382 is not provided and the power generated in the generator 380 is charged in the battery 312. In this case, the weight of the conveying vehicle 310 is reduced by only the weight of the removed auxiliary battery 382.

The conveying vehicle 310 as described above runs by properly driving the main driving wheel 330 and the auxiliary driving wheels 338 under the control of the controller 322. However, wheels 384a to 384d which are driven and rotated during the running of the vehicle based on the main driving wheel 330 and the auxiliary driving wheel 338 are further supported through shafts by the vehicle body frame 324 (see FIG. 16). The wheels 384a and 384b serving as the front wheels in the forward running direction (the direction of the arrow in FIG. 5) of the conveying vehicle 310 may be made to function as steering wheels steered under the control of the controller 322, for example, or the wheels 384c and 384d serving as the rear wheels may be made to function as steering wheels.

Furthermore, a sensor 388 (see FIG. 17) for detecting the magnetic field of a magnetic tape 386 (see FIG. 20) which is attached onto a passage on which the conveying vehicle 310 runs in a factory and guides the conveying vehicle 310 is provided at the vehicle bottom surface side of the conveying vehicle 110. Accordingly, the conveying vehicle 10 can be magnetically induced. In place of the above method of guiding the conveying vehicle 310, a method of laying down a rail on the floor surface and inducing the conveying vehicle along the rail or other methods may be used.

Next, the running operation of the conveying vehicle 310 according to the third embodiment will be described.

The conveying vehicle 310 is basically controlled under the control of the controller 322 so that it runs (starts running) by using the auxiliary power unit 318 when it starts running from the stopped state and also runs by using the main power unit 314 when it runs normally after the start of running.

For example, when the conveying vehicle 310 is stopped at each of the standby station and the work stations 302a to 302c (FIG. 14) is stopped, the battery 312 of the conveying vehicle 310 is charged by the external power source 331 provided to each of the work station 320a to 302c. Here, when the conveying vehicle 310 runs (starts running) by using the auxiliary power unit 318, the wind-up motor 336 connected to the external power source 331 is driven, and the spiral spring 332 of the energy stocking mechanism 334 is wound up by the driving force of the wind-up motor 336.

At this time, the controller 322 sets the brake 335 to a release state (OFF), sets the spiral spring brake 354 to an operating state (ON) and sets the input clutch 351 and the output clutch 353 to a separation state (OFF). That is, by operating the spiral spring brake 354, the first shaft 341a is fixed so that it does not rotate, and also by separating the input clutch 351, when the second shaft 341b is rotated, this rotation is prevented from being transmitted to the intermediate shaft 342.

When the motor-side coupling unit 321 of the wind-u motor 336 is engaged with the coupling unit 325 of the input shaft 327 and the wind-up motor 336 is driven, as shown in FIG. 19A, the rotation in the normal rotational direction of the wind-up motor 336 is transmitted to the second shaft 341b through the input shaft 327, the first sprocket 337, the chain 339, the second sprocket 348 and the first one-way clutch 349, and thus the second shaft 341b is rotated together with the casing 345, so that the spiral spring 332 is wound up around the first shaft 341a. Under this state, elastic force for rotating the second shaft 341b in the reverse rotational direction occurs in the spiral spring 332. Therefore, when the spiral spring 332 is wound up, the controller 322 operates (turns on) the brake 335 provided to the input shaft 327. Accordingly, the input shaft 327 and the second shaft 341b are fixed so that they does not rotate in the reverse rotational direction. Therefore, the wind-up motor 336 can be detached from the input shaft 327 by separating the above coupling unit. As described above, in the energy stock mechanism 334, the power (rotational torque) of the wind-up motor 336 is converted to the elastic force of the spiral spring 332 and stocked.

Next, after the charging of the battery 312 by the external power source 331 and the stock of the elastic force in the energy stocking mechanism 334 are completed, a preparation for start of running (start moving) is made. That is, the controller 122 sets the output clutch 353 to a connection state (ON). Accordingly, the fourth sprocket 352 and the first shaft 341a are engaged with each other, and the fourth sprocket 352 can be rotated together with the rotation of the first shaft 341a, so that the power (rotational force) of the first shaft 341a is allowed to be transmitted to the auxiliary driving wheel 338 through the intermediate shaft 342 and the driving shaft 343. In this case, the holding based on the spiral spring brake 354 which sets the first shaft 341a to the rotation-stopped state, and the holding based on the motor brake 336a which sets the second shaft 341b to the rotation-stopped state are continued.

When the spiral spring brake 354 is released, as shown in FIG. 19B, the elastic force of the spiral spring 332 is released, so that the first shaft 341a is roundly rotated. Accordingly, the rotational driving force of the first shaft 141a is transmitted to the driving shaft 343 through the fourth sprocket 352, the chain 358, the sixth sprocket 359, the second one-way clutch 361, the intermediate shaft 342, the seventh sprocket 363, the chain 365 and the eighth sprocket 367, whereby the driving shaft 343 is rotated. Accordingly, the auxiliary driving wheel 338 is rotated so that the conveying vehicle 310 moves forwardly, and thus the conveying vehicle 310 can start running (moving).

With respect to the start of running based on the auxiliary power unit 318 as described above, the first shaft 341a is rotated to apply a rotational torque to the auxiliary driving wheel 338 at least until the elastic force stocked in the spiral spring 332 is released. Furthermore, the second one-way clutch 361 is provided between the intermediate shaft 342 and the sixth sprocket 359. Therefore, even when the elastic force stocked in the spiral spring 332 is released and the rotational speed of the first shaft 341a is lower than the rotational speed of the intermediate shaft 342, the second one-way clutch 161 slips and thus the rotation of the intermediate shaft 342 and the driving shaft 343 is continued, so that the conveying vehicle 310 can run by some degree of distance with the inertial force thereof. Accordingly, the conveying vehicle 310 can run with only the elastic force stocked in the spiral spring 332 of the energy stocking mechanism 334 among working stations in a factory by designing the conveying vehicle 310 in consideration of the vehicle weight of the conveying vehicle 310 containing a work to be conveyed, the characteristic of the spiral spring 332, losses of the respective bearings, etc., for example.

A clutch (not shown) may be disposed between the driving shaft 328a of the running motor 328 and the main driving wheel 330 so that the clutch concerned is set to a separation state when the conveying vehicle 310 starts running by the auxiliary power unit 318. In this case, the load on the running motor 328 which is not used at the running start time can be reduced, and also the load from the running motor 328 can be effectively suppressed from affecting the running starting operation.

When the running of the conveying vehicle 310 is continued after the start of running based on the auxiliary power unit 318, the controller 322 drives the main power unit 314, and drives the running motor 328 with the power from the battery 312, whereby the conveying vehicle can continuously run as a normal electrically-operated vehicle.

Subsequently, when the conveying vehicle 310 runs, the controller 322 executes an operation of regenerating the rotational power of the auxiliary driving wheel 338 to the spiral spring 332 of the energy stocking mechanism 334. In this case, from the viewpoint of energy, it is more desired to execute the regenerating operation during deceleration of the conveying vehicle 310 than during running of the conveying vehicle 310 based on the running motor 328.

When the conveying vehicle 310 shifts to a decelerating operation, the controller 322 sets the spiral spring brake 354 to the operating state (ON), and also sets the input clutch 351 to the connection state (ON), whereby the third sprocket 350 and the second shaft 341b are engaged with each other. Accordingly, the rotational driving force of the auxiliary wheel 338 is transmitted to the second shaft 341b through the driving shaft 343, the eighth sprocket 367, the chain, the seventh sprocket 363, the intermediate shaft 342, the fifth sprocket 357, the chain 356 and the third sprocket 350, and the casing 345 is rotated together with the second shaft 341b, whereby the spiral spring 332 is wound up around the first shaft 341a.

As described above, in this construction, the input clutch 351 is set to the connection state (ON) during the running of the conveying vehicle 310, whereby the rotational driving force of the auxiliary driving wheel 338 can be regenerated (stocked) as the elastic force of the spiral spring 332. Therefore, in the next running operation, the wind-up motor 336 may be driven at a station to supplement the spiral spring 332 of the energy stocking mechanism 334 with elastic force which is not enough even by the regeneration. Accordingly, the power for stocking the elastic force into the spiral spring 332 can be reduced, and the power consumption for driving the wind-up motor 336 can be reduced, so that energy saving can be implemented.

In a general vehicle in which elastic force is stocked by winding up a spiral spring around a rotational shaft, the rotational direction of the rotational shaft when elastic force is stocked is opposite to the rotational direction of the rotational shaft when the stocked elastic force is output (released). Therefore, when elastic force is output to a shaft rotating in a fixed direction under normal running (for example, forward running) and elastic force is generated by using the rotational driving force of this shaft as in the case of the driving shaft of the conveying vehicle, it is necessary to provide a mechanism for reversing the rotational shaft of the spiral spring between the output operation and the regenerating operation. Therefore, the construction of the vehicle is complicated.

On the other hand, according to the construction of this embodiment, the energy stocking mechanism 334 has the divided first and second shafts 341a and 341b and the spiral spring 332 disposed between these shafts, and thus the first shaft 341a and the second shaft 341b can be rotated in the same rotational direction in the output operation of outputting the elastic force stocked in the spiral spring 332 to the auxiliary driving wheel 338 and in the regenerating operation of regenerating (stocking) the rotational driving force of the auxiliary driving wheel 338 as the elastic force into the spiral spring 332. Therefore, it is unnecessary to provide a mechanism for reversing the rotation of the rotational shaft between the elastic force stocking (regenerating) operation and the elastic force outputting operation, and thus the construction of the energy stocking mechanism can be simplified.

As described above, according to the conveying vehicle 310 of the second embodiment, the auxiliary driving wheel 338 is driven by the elastic force stocked in the spiral spring 332 of the energy stocking mechanism 334, whereby the conveying vehicle can start running from the stopped state. In this case, the wind-up motor 336 for winding up the spiral spring 332 is driven by the external power source 331 when the conveying vehicle 310 is stopped. Therefore, it is unnecessary to consume the battery 312, and also the wind-up motor 336 can be driven simultaneously with charging of the battery 312, so that no time loss occurs. Furthermore, after the conveying vehicle 310 starts running by using the auxiliary power unit 318, the conveying vehicle can electrically run by using the main power unit 314 as in the case of a general electrically-operated vehicle. Therefore, the conveying vehicle can run on a desired passage by a desired distance.

Furthermore, in general, the power amount (current amount) of the motor under low-speed rotation is larger than that under predetermined high-speed rotation, and also the driving torque required to start running from a stopped state is very larger than the driving torque under a stationary running state. In other words, if the conveying vehicle 310 is made to start running by using the running motor 328, the running motor 328 must rotate at a low speed and output a high torque. Therefore, the power consumption thereof would be extremely larger that the power consumption of the wind-up motor 336 for winding the spiral spring 332.

On the other hand, the start of running of the conveying vehicle 310 can be covered by the elastic force of the spiral spring 332, and thus a low-power and compact motor can be used as the running motor 328. Particularly, with respect to the conveying vehicle 310 which is also required to convey a work as a heavy load, the load associated with the start of running is very large, and the effect thereof is remarkable. Furthermore, in the conveying vehicle 310, it is hardly required to use the battery 112 at the running start time. Therefore, the battery 312 can be designed to be small in capacity and compact in size, and thus weight saving and energy saving for the conveying vehicle 110 can be performed. In addition, since the spiral spring is used as the elastic member constituting the energy stocking mechanism 334, the auxiliary power unit 118 can be constructed simply and in low cost.

In the conveying vehicle 310 of the first embodiment, the conveying vehicle 310 according to this invention can be made to run by selectively driving the main power unit 314 and the auxiliary power unit 318 as described above, whereby the energy saving can be more greatly performed as compared with the normal electrically-operated vehicle. With respect to the elevating device 360 constituting the mount portion 320 on which a work is mounted, it is provided with the generator 380, the auxiliary battery 382, etc., whereby energy saving can be further greatly enhanced.

That is, in the elevating device 360, before the work W is mounted on the mount table 316, under the control of the controller 322, the control valve mechanism 376 is first switched and the pump 378 is driven, and oil pressure is applied in the hydraulic circuit 366 in a direction of a broken-line arrow P in FIG. 18. Accordingly, the lower chamber 364b is pressurized, and the mount table 116 is upwardly moved to a desired height position through the piston 374.

Subsequently, the work W is mounted on the mount table 316. At this time, by preventing leakage of hydraulic pressure from the lower chamber 364b through the control valve mechanism 376 and keeping the pressurized state, the height position of the work W can be kept easily and with saved power without keeping the driving of the pump 378.

When the work W is mounted on the mount table 316 or the work W held at the desired height position is downwardly moved, the control valve mechanism 376 is properly controlled so that the mount table 316 is downwardly moved by the weight of the work W and the mount table 316 without driving the pump 378. That is, the control valve mechanism 376 is controlled to be switched so that the operating oil can flow out from the lower chamber 364b and the flow-out operating oil flows through the hydraulic circuit 366 in the direction of a solid-line arrow Q. Accordingly, the operating oil flows out from the lower chamber 364b which is compressed due to the downward movement of the piston 374 in connection with the downward movement of the work W and the mount table 316, so that a vane wheel (not shown) or the like of the generator 380 is rotated to generate power and the generated power is stocked in the auxiliary battery 382.

In the elevating device 360, the pump 378 is driven with the stocked power from the auxiliary battery 382, and the mount table 316 can be returned to the desired height position. When the power from the auxiliary battery 382 is insufficient to return the mount table 316 to the desired height position, the battery 312 may be used in combination.

As described above, in the elevating device 360, power can be generated in the generator 380 by using the weight of the work W and the weight of the mount table 316, and utilized as a driving source of the pump 378 which is used to move the mount table 316 upwardly again through the auxiliary battery 382. That is, the elevating device 360 has an energy regenerating mechanism for regenerating the potential energy of the work W mounted on the mount table 316 at the desired height position as electrical energy by using the hydraulic circuit 366 and the generator 380, and charging the auxiliary battery 382. Therefore, basically, the energy required to move the mount table 316 upwardly and downwardly can be covered by the elevating device 360 itself.

Accordingly, the conveying vehicle 310 has the elevating device 360 having the energy regenerating mechanism described above, and thus it is unnecessary to use power of the battery 312 or the like as elevating energy of the mount table 316. Therefore, the battery 312 can be designed to be smaller in capacity and more compact in size, and thus the energy saving of the conveying vehicle 310 can be more greatly enhanced.

As shown in FIG. 18; in the conveying vehicle 310, the electrical energy which is regenerated by the elevating device 360 and output from the generator 380 may be used not only to charge the auxiliary battery 382, but also to derive the wind-up motor 336 of the auxiliary power unit 318. Accordingly, even when it is unnecessary to charge the battery 312 under the stopped state or no external power source 331 is provided to a station or the like at which the conveying vehicle is stopped, the wind-up motor 336 may be driven with the power from the auxiliary battery 382 without using any power from the battery 312 to stock elastic force in the energy stocking mechanism 334.

In addition, the mount table 316 on which the work W is mounted may be downwardly moved at a desired timing to generate power when the conveying vehicle 310 is stopped, whereby the power from the generator 380 is supplied to the auxiliary motor 136 to stock elastic force in the spiral spring 332 when the conveying vehicle 310 is stopped. That is, at the stop time of the conveying vehicle 310, the loading of the work W onto the mount table 316 and the stock of elastic force into the spiral spring 332 can be simultaneously performed, and after the work W is loaded, the quick start of running by the auxiliary power unit 318 can be performed. Therefore, further energy saving and speed-up of the conveying work can be performed.

Next, the conveying system 300 to which the conveying vehicle 310 according to the third embodiment is applied will be described.

First, as shown in FIG. 20, a conveying vehicle 310 which is on standby at a standby station 304 of the conveying system 300 is supplied with power from the external power source 331 to charge the battery 312 and stock elastic force in the energy stocking mechanism 334 by the driving force of the wind-up motor 336. After these works are completed, the conveying vehicle 310 concerned starts running by using the auxiliary power unit 318 as a driving source. The conveying vehicle 110 which starts running is guided by a magnetic tape 386 by detecting magnetic field through a sensor 388 under the control of the controller 322, and reaches a first work station 302a.

In this case, in the energy stocking mechanism 334, the rotational driving force of the auxiliary driving wheels 338 are regenerated as elastic force in the spiral spring 332 under the deceleration of the conveying vehicle 310. Therefore, at the work station 302a, the wind-up motor 336 may be driven to supplement the spiral spring 332 of the energy stocking mechanism with elastic force which is not enough even by the regeneration. Accordingly, the power for stocking the elastic force in the spiral spring 332 can be reduced, and the power consumption for driving the wind-up motor 336 can be reduced, so that energy saving can be performed.

When the distance between the standby station 304 and the work station 302a is within a sufficiently reachable distance at which the conveying vehicle starting from the standby station 304 reaches the work station 302a by only the power of the auxiliary power unit 318, it is unnecessary to drive the main power unit 314 after the conveying vehicle 110 starts running, and thus the power can be extremely saved. The same is applied to the movement between the following respective work stations.

Subsequently, for example, a work W such as a vehicle engine or the like is loaded onto the mount table 316 of the conveying vehicle 310 reaching the work station 302a by a working robot 306a provided to the work station 302a. Furthermore, in the elevating device 360, energy is regenerated by using the weight of the work W to charge the auxiliary battery 382 as occasion demands.

When power generation is executed in the elevating device 360 substantially simultaneously with the loading of the work W, the wind-up motor 336 may be driven with the generated power, and elastic force can be stocked in the energy stocking mechanism 134. In some cases, the external power source 331 may be omitted from the work station 302a.

The conveying vehicle 310 on which the work W is loaded starts running by using the auxiliary power unit 318 as the driving source, and reaches the second work station 302b. At the second work station 302b, for example, a desired part (not shown) is assembled with the work W conveyed from the work station 302a by a working robot 306b.

Subsequently, when the conveying vehicle 310 reaches the third work station 302c, for example, a working robot 306c conveys the work W assembled with the desired part from the mount table 316. At the same time, the wind-up motor 336 is engaged with the input shaft 327, and elastic force is stocked in the energy stocking mechanism 334 by the external power source 331 again.

Thereafter, the conveying vehicle 310 starting from the work station 302c runs on a passage along which it returns to the standby station 304 again. At this time, by driving the main power unit 314 after the running start based on the auxiliary power unit 318, the convey vehicle 310 can easily come back to the standby station 304 even when the distance of the return passage to the standby station 304 is relatively long. The conveying vehicle 310 returning to the standby station 304 is supplied with power from the external power source 331 again, and charging of the battery 312 and the stock of elastic force in the energy stocking mechanism 334 are performed. Furthermore, by driving the elevating device 360 with the auxiliary battery 82 charged at the work station 302a, the mount table 316 can be upwardly moved to a desired height position.

As described above, in the conveying system 300, the conveying vehicle 310 can move between the respective work stations or the like with only the power of the auxiliary power unit 318, and thus the work can be performed with extremely saved power. Of course, the main power unit 314 can be driven during the movement between the respective work stations or the like as occasion demands.

In addition, the conveying vehicle 310 can run by using the running motor 328 as in the case of the normal electrically-operated vehicle. Therefore, even when the running passage is relatively long, the conveying vehicle can surely move on the running passage, and the degree of freedom of the design of the moving passage can be enhanced. Therefore, as indicated by a broken line of FIG. 20, the running passage of the conveying vehicle 310 can be easily changed by re-attaching the magnetic tape 386 and slightly changing the control program of the controller 322.

As described above, according to the third embodiment, the vehicle system contains the conveying vehicle having the energy stocking mechanism 334 containing the spiral spring 332 which is connected to the auxiliary driving wheel 338 of the vehicle body frame 324 and can convert power to elastic force, stock the elastic force and output the stocked elastic force as power to the auxiliary driving wheel 338, and the work stations 320a to 302c at which the conveying vehicle 310 is stopped. Each of these work stations 302a to 302c is provided with the wind-up motor 336 which is connected to the energy stocking mechanism 334 of the conveying vehicle 310 to stock power into the spiral spring 332 of the energy stocking mechanism 334 when the conveying vehicle 310 is stopped at each of the work stations 302a to 302c. Therefore, it is unnecessary to provided the conveying vehicle 310 with the wind-up motor 336 for winding up the spiral spring 332, and thus the weight and size of the conveying vehicle 310 can be reduced.

Furthermore, only the rotational driving force may be supplied from the wind-up motor 336 of each of the work stations 302a to 302c through the input shaft 327 to the energy stocking mechanism 334 of the conveying vehicle 310, and elastic force can be easily stored in the spiral spring 332 even in a water-wetted working field. In addition, the wind-up motor 336 is not provided to each conveying vehicle 310, but to each of the work stations 302a to 302c, and thus when the number of the work stations is smaller than the number of the conveying vehicles, the number of the electrically-operated motors to be installed is reduced, and thus the system construction can be implemented in low cost.

Furthermore, according to the third embodiment, the conveying vehicle 310 has the clutch mechanism 340 for performing the switching operation between the output of power from the spiral spring 332 of the energy stocking mechanism 334 to the auxiliary driving wheel 338 of the vehicle body frame 324 and the regeneration of power from the auxiliary driving wheel 338 to the spiral spring, and when the conveying vehicle 310 moves between the work stations 302a to 302c, the conveying vehicle 310 runs with the power stocked in the energy stocking mechanism 334, and the clutch mechanism 340 is switched to the regeneration side during running so as to enable regeneration of power from the auxiliary driving wheel 338 to the spiral spring while the conveying vehicle 310 runs. Accordingly, by switching the clutch mechanism 340, the power of the auxiliary driving wheel 338 during running can be regenerated (stocked) as the elastic force of the spiral spring 332 of the energy stocking mechanism 334.

Therefore, at a work station, the wind-up motor 336 may be driven to supplement the spiral spring 332 of the energy stocking mechanism 334 with extra elastic force to be added to insufficient elastic force stocked by only the regeneration. Accordingly, the power for stocking the elastic force into the spiral spring 332 can be reduced, and the power consumption for driving the wind-up motor 336 can be reduced, so that energy saving can be performed.

Furthermore, according to the third embodiment, the conveying vehicle has the main driving wheel 330 for driving the vehicle body frame 324, and the running motor 328 for driving the main driving wheel 330, and the power stocked in the spiral spring of the energy stocking mechanism 334 assists the driving force of the running motor 328 when the conveying vehicle starts running. Therefore, a low-power and compact motor can be used as the running motor 328, and weight saving and energy saving for the conveying vehicle 310 can be performed. Furthermore, the clutch mechanism 340 is switched to the regeneration side when the conveying vehicle is located at a position near to the end point of the distance between the respective work stations, and thus the power can be regenerated from the auxiliary driving wheel to the spiral spring 332 during running. Therefore, at a work station where the conveying vehicle stops, the wind-up motor 336 may be driven to supplement the spiral spring 332 of the energy stocking mechanism 334 with elastic force to be added to insufficient elastic force stocked by only the regeneration. Accordingly, the power for stocking the elastic force into the spiral spring 332 can be reduced, and the power consumption for driving the wind-up motor 336 can be reduced, so that energy saving can be performed.

The present invention is not limited to the above embodiments, and various modifications may be made without departing from the subject matter of the present invention.

For example, in the above embodiments, the conveying vehicle 10, 110, 310 includes the main power unit 14, 114, 314 having the running motor 28, 128, 328, and the energy stocking mechanism 34, 134, 334 is used as an assist when starting running. However, for example when a running distance is predetermined as in the case of running between work stations, by designing the energy stocking mechanism 34, 134, 334 so as to meet a condition, the main power unit 14, 114, 314 may be omitted.

Furthermore, the conveying vehicle 10, 110, 310 of the above embodiments has the running motor 28, 128, 328 as the running driving source for the main power unit 14, 114, 314. It is needless to say that other driving sources such as an internal combustion engine such as an engine or the like, a, spiral spring, etc. may be used. In the above embodiments, the battery 12, 112, 312 is provided as the power supply unit for supplying power to the running motor 28, 128, 328. However, a power line may be laid down on the floor or the like so that power is supplied to the running motor through the power line. Furthermore, the battery 12, 112, 312 is not charged by only the external source, but a solar panel may be provided to a conveying vehicle so that the solar panel and the external power source are used in combination.

Furthermore, in the above embodiment, the electrically-operated auxiliary motor 36, 136 or the wind-up motor 336 is used as the driving source for power stocking, however, the present invention is not limited to these elements. For example, an air motor which is used for an impact wrench or the like and rotationally driven by using compressed air as a driving source may be used insofar as it applies rotational driving force to the main shaft 42 and the second shaft 141b, 341b.

The conveying vehicle 10, 110, 310 may be designed so that it can normally run as in the case of a general electrically-operated vehicle while starting running, running at a constant-speed, accelerate speed, etc. by the driving force obtained by the main power unit 14, 114, 314 having the running motor 28, 128, 328 driven with power from the battery 12, 112, 312 and the main driving wheel 30, 130, 339. That is, the conveying vehicle 10, 110, 310 can run substantially in the same manner as a general electrically-operated vehicle, and thus it can retrogress (back away), etc., and thus the degree of freedom of the construction of the conveying system 100, etc. can be further enhanced.

Furthermore, the auxiliary power unit 18, 118, 318, etc. containing the energy stocking mechanism 34, 134, 334, etc. may be constructed as a traction vehicle which is configured separately from the main power unit 14, 114, 314. In this case, the traction vehicle may be externally attached to the conveying vehicle having the main power unit 14, 114, 314 and the loading portion 20, 120, 320 so as to pull or push the conveying vehicle, whereby the function based on the auxiliary power unit 18, 118, 318 can be easily added to existing AGV or the like.

Furthermore, the conveying vehicle 10, 110, 310 may be modified so that the loading portion 20, 120, 320 is omitted, and it may be configured as an electrically-operated vehicle which transports another burden in place of conveyance of a work W and also in which persons get.

According to the second embodiment and the third embodiment, in the energy stocking mechanism 134, 334, the casing 145, 345 is connected to the second shaft 141b and 341b. However, the casing may be connected to the first shaft 141a, 341a. Furthermore, in the second embodiment and third embodiment, the cylindrical casing 145, 345 is fixed to the second shaft 141b, 341b. However, when it is configured to extend in parallel to the shaft end portion of the first shaft 141a, 341a, a substantially L-shaped member may be fixed to the shaft end portion of the second shaft 141b, 341b.

What is claimed is:

1. A vehicle running with power from a power source comprising:
    an energy stocking mechanism having an elastic member that is connected to a driving wheel of a vehicle main body, converts power of the driving wheel to elastic force, stocks the converted elastic force and outputs the stocked elastic force as power to the driving wheel; and
    an output limiter that holds the energy stocking mechanism while the elastic force is stocked in the elastic member, and releases the holding of the energy stocking mechanism to output the elastic force when the vehicle starts running, wherein the power source is a power stocking source for stocking elastic force in the energy stocking mechanism, and the energy stocking mechanism is connectable to the power stocking source so that power from the power stocking source is applied to the energy stocking mechanism and stocked as the elastic force in the energy stocking mechanism.

2. The vehicle according to claim 1, wherein the power stocking source is installed in the vehicle main body so as to be connected to the energy stocking mechanism.

3. The vehicle according to claim 1, wherein the output limiter comprises a gear formed on a shaft connected to the driving wheel, and a ratchet that has a pawl engaged with the gear to lock the shaft when the elastic force is stocked in the energy stocking mechanism and swings the pawl so that the pawl is separated from the gear when the elastic force is output from the energy stocking mechanism.

4. The vehicle according to claim 1, wherein the elastic member of the energy stocking member is formed of a spiral spring that is wound up around a shaft connected to the driving wheel, and one end of the spiral spring is connected to an outer periphery of one shaft end portion of the shaft while the other end of the spiral spring is connected to a parallel portion that extends in parallel to the shaft end portion of the shaft and rotates around the shaft interlockingly with the stocking power source.

5. The vehicle according to claim 1, further comprising a controller for controlling the output limiter so that the elastic force stocked in the energy stocking mechanism is allowed to be output when the vehicle starts running and the rotation of a shaft is locked when a desired time elapses after the speed of the vehicle main body reaches a desired speed.

6. The vehicle according to claim 1, further comprising a main driving wheel for driving the vehicle main body and a running driving source for driving the main driving wheel, wherein the power stocked in the elastic member of the energy stocking mechanism assists driving force of the running driving source.

* * * * *